United States Patent
Pichler et al.

(10) Patent No.: US 6,929,081 B2
(45) Date of Patent: Aug. 16, 2005

(54) ENGINE ARRANGEMENT FOR A FOUR CYCLE ENGINE

(75) Inventors: Anton Pichler, Steyr (AT); Rudolf Kusel, Thalheim bei Wels (AT); Gerd Ohrnberger, Rutzenmoos (AT); Sylvain Matte, St-Denis de Brompton (CA)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 0 days.

(21) Appl. No.: 10/230,387

(22) Filed: Aug. 29, 2002

(65) Prior Publication Data

US 2004/0031636 A1 Feb. 19, 2004

Related U.S. Application Data

(60) Provisional application No. 60/402,709, filed on Aug. 13, 2002.

(51) Int. Cl.[7] ............................................. B62M 27/02
(52) U.S. Cl. .......................................................... 180/190
(58) Field of Search ................................ 180/190, 186, 180/182; 123/196 R; 184/6.5, 6.8, 6.13; 60/597

(56) References Cited

U.S. PATENT DOCUMENTS 5,662,077 A * 9/1997 Boswell ................. 123/184.21
6,510,912 B1 * 1/2003 Atsuumi ..................... 180/69.1
6,708,664 B2 * 3/2004 Ito ............................ 123/196 R
6,725,958 B2 * 4/2004 Ashida et al. ............... 180/186
6,745,862 B2 * 6/2004 Morii et al. .................. 180/296
2002/0027029 A1 3/2002 Yatagai et al.
2002/0134603 A1 9/2002 Ashida et al.
2003/0146032 A1 8/2003 Yatagai et al.

FOREIGN PATENT DOCUMENTS

| EP | 0 416 636 B1 | 12/1996 |
| EP | 0 758 050 B1 | 12/1999 |
| EP | 1 128 087 A2 | 8/2001 |

OTHER PUBLICATIONS

European Search Report dated Nov. 3, 2003, for European Patent Application No. 03018407, which is the European Counterpart of the U.S. Application captioned above.

* cited by examiner

*Primary Examiner*—Tony Winner
(74) *Attorney, Agent, or Firm*—BRP Legal Services

(57) ABSTRACT

An arrangement of a four cycle engine is disclosed for use in a vehicle providing a relatively low center of gravity for improved handling and maneuverability. The engine components are located on opposing sides of the longitudinal axis of the vehicle and behind the axis of the crankshaft to move the center of gravity to the middle of the vehicle.

17 Claims, 25 Drawing Sheets

ENGINE ARRANGEMENT FOR A FOUR CYCLE ENGINE

CROSS REFERENCE TO RELATED APPLICATIONS

This application is related to and claims priority to U.S. Provisional Patent Application Ser. No. 60/402,709, which was filed on Aug. 13, 2002.

BACKGROUND OF THE INVENTION

1. Field of the Invention

The present invention relates to an engine arrangement for a four-cycle engine that is intended for use in a vehicle, such as for example a snowmobile or a three-wheeled vehicle. More particularly, the present invention relates to a four-cycle engine that complies with the strict emission control regulations currently developed in the United States without having a negative effect on the balance of the vehicle. The engines disclosed herein are described in connection with a snowmobile. The present invention, however, is not intended to be so limited; rather, it is contemplated that the engines described herein may be used in motorcycles, all-terrain vehicles, and various watercraft.

2. Description of Related Art

Snowmobiles are used for cross-country travel, during which it is frequently necessary to negotiate steep ascending and descending gradients, which requires powerful engines. Snowmobiles are used for both leisure-time pursuits as well as in a work environment. With this in mind, various demands are placed on the engine characteristics with respect to engine speed and torque. Known snowmobiles include a frame. Two steerable spring-mounted skis are installed on the front of the frame. A track driven by the engine is located on the lower rearward end of the frame. The track serves to propel the snowmobile over snow or ice covered ground. The engine and the track are usually connected by way of a continuously variable transmission (CVT), and a positive connection between the engine and the CVT. The positive connection is typically a centrifugal clutch that is integrated into the CVT.

At present, two-cycle engines are typically used to drive snowmobiles because these engines are capable of delivering a relatively large power output for a small installed size and low weight. Two-cycle engines, however, emit a considerable quantity of unburned hydrocarbons and other pollutants into the environment in the form of exhaust gas. The hydrocarbons and other pollutants are formed within the engine cylinders during the combustion process when the cylinder is inadequately flushed, and as a result of the lubricating oil that is added to the fuel.

Considerable structural and design modifications must be incorporated into the two-cycle engine to comply with current and ever more rigorous emission control regulations, which results in higher production costs. These modifications may include fuel injection and the use of catalysts. Furthermore, costly design features must be incorporated when the engines are used in snowmobiles to ensure that noise emissions are comparable to those of four-cycle engines.

One known snowmobile having a four-cycle engine is manufactured by Redline. The engine is a single overhead cam (SOHC), V-twin internal combustion engine that develops approximately 90 kW of power. The engine was originally designed for use in a motorcycle. These snowmobiles, which are up-market vehicles that are marketed under the brand name "954 Revolution," are sport machines having a tubular frame. As such, these vehicles are only suitable for small-scale production. Due to predetermined minimum track width, the CVT is always remote from the longitudinal axis of the snowmobile. This arrangement is problematic especially for V-twin designs. If the center of gravity of the engine and the center of gravity of the CVT are on the same side of the vehicle, this would have a negative impact on the balance of the snowmobile and handling is made more difficult.

If the center of gravity of the engine (without auxiliary units) is arranged on the longitudinal axis of the snowmobile or on the opposite side of the vehicle relative to the center of gravity of the CVT, such an arrangement would require a relatively long drive shaft between the engine and the CVT. This arrangement, however, would generate undesirable oscillations within the drive train, which could result in a reduction of the service life or the destruction of the drive train. Furthermore, an engine in a snowmobile should be located to the rear as far as possible in order to locate its center of gravity as close possible to the track, which enhances the snowmobile handling and improves driving dynamics. This arrangement is not possible in the Redline design because the engine would collide with the steering rod.

Maximumsled also produces a snowmobile under the brand name "Venom" that is also based on a motorcycle engine. This snowmobile suffers from many of the same problems discussed above.

Large-scale production snowmobiles are typically manufactured from a sheet metal profile frame that is preferably of aluminum. A snowmobile of this kind is sold, for example, by Yamaha under the brand name "RX-1" and "RX-1 ER." This snowmobile is powered by a four-cycle, four-cylinder, in-line, carburetor-type motorcycle engine that is installed transversely to the longitudinal axis of the vehicle. The engine has a dry-sump lubrication system, and develops approximately 107 kW of power. This engine has a relatively high nominal engine speed. As a result, additional reduction gearing has to be installed between the crankshaft and the drive pulley of the CVT. This engine has numerous drawbacks including a greater installed length and a greater weight. Furthermore, the exhaust runs beneath the tank and beneath the seat to the rear of the snowmobile. This produces a significant buildup of heat beneath the tank and the seat.

Published U.S. patent application Ser. No. 09/925,522 to Yatagai et al. discloses a snowmobile four-cycle engine arrangement. Yatagai discloses a four-cycle engine arranged in an engine compartment formed in the front body of a snowmobile. The crankshaft of the engine is laid substantially parallel to the body width of the snowmobile. The engine has a cylinder case inclined in a forward direction. The engine has a dry sump oil supplying system and an oil tank separate from the engine. This engine arrangement has several drawbacks. First, the cylinders are inclined in the forward direction. The turbocharger and oil tank are located in front of the engine. With this arrangement, the center of gravity of the engine is positioned relatively far away from a center point of the vehicle and the track. This adversely impacts the handling and maneuverability of the snowmobile. Second, the snowmobile is typically operated in severe working conditions (temperature changes between +15° C. to −40° C., ice formation, etc.). The water pump and alternator are belt driven. The belt is prone to failure.

OBJECTS OF THE INVENTION

It is an object of the present invention to provide a four cycle engine for use in a vehicle.

It is another object of the present invention to provide a four cycle engine having a low center of gravity for improved vehicle handling and maneuvering.

It is another object of the present invention to provide a four cycle engine overcoming the drawbacks of the prior art.

It is another object of the present invention to provide a four cycle engine having a single cylinder.

It is another object of the present invention to provide a four cycle engine having a pair of cylinders arranged in a V-shaped orientation.

It is another object of the present invention to provide a four cycle engine having a small installed size and low weight with a high level of performance relative to the volumetric displacement of the engine.

It is another object of the present invention to locate and orient the four cycle engine in accordance with the present invention in a vehicle such that the vehicle has a relatively low center of gravity.

It is another object of the present invention to provide a four cycle engine that has a crankshaft axis that is transverse to the longitudinal axis of the vehicle, wherein the center of gravity of the four cycle engine is located as close to the longitudinal axis of the vehicle as possible.

It is another object of the present invention to provide a four cycle engine having specific components that are located on opposing sides of the longitudinal axis of the vehicle to balance the engine with respect to the vehicle and locate the center of gravity of the engine as close to the longitudinal axis of the vehicle as possible.

It is another object of the present invention to arrange the induction system and the exhaust system on opposite sides of the engine, such that the combustion air is not heated to improve cylinder charging.

It is another object of the present invention to provide an engine that enhances the manner in which a snowmobile handles, whereby the resulting center of gravity that is determined by the vehicle frame and the engine is located as close as possible to the center of the vehicle in order to reduce the inertia of the snowmobile about its vertical axis.

It is another object of the present invention to provide an engine for use in a snowmobile having engine components and auxiliary units arranged as close as possible to the track of the snowmobile.

It is another object of the present invention to provide an engine having the cylinders rotated as far as possible to the rear, whereby the rear cylinder is located to one side of the steering rod.

SUMMARY OF THE INVENTION

To overcome the deficiencies of the prior art and achieve the above-described objectives, applicants have developed a four cycle engine for use in a vehicle, which produces a vehicle with a relatively low center of gravity for improved handling and maneuverability. The four cycle engine in accordance with the present invention has a crankcase having a crankshaft. The crankshaft has a crankshaft axis that is arranged transverse to the longitudinal axis of the vehicle.

The engine includes a front side located on one side of the crankshaft axis and a rear side located on an opposite side of the crankshaft axis.

The engine in accordance with the present invention may have one or more cylinders. In a one cylinder arrangement, the cylinder unit is located on the rear side of the crankshaft axis. In a two or more cylinder arrangement, the cylinder units are located on opposite sides of the crankshaft axis.

The engine further includes a CVT connected to the engine on one side of the longitudinal axis of the vehicle. The CVT is driven by the crankshaft.

The engine also includes at least one auxiliary unit connected to the crankcase. The auxiliary units include, but are not limited to a generator, an alternator, a water pump, an oil pump, and a charger. The auxiliary units are driven by a drive gearing having a toothed wheel gearing. Each of the auxiliary units are located on a side of the longitudinal axis of the vehicle opposite to the CVT. The toothed-wheel gearing may be located within a secondary housing connected to the crankcase. To improve handling and maneuverability of the vehicle, it is desirable to locate the centers of gravity of the auxiliary units to the rear side of the engine behind the crankshaft axis.

The four cycle engine in accordance with the present invention further includes a starter operatively connected to the drive gearing. The starter has a center of gravity that is located to the rear side of the engine.

The vehicle further includes a steering rod. The steering rod extends in an upwardly rearward direction. One of the cylinder units is located on the rear side of the engine adjacent the steering rod. The cylinder unit located on the rear side of the engine has a cylinder axis. A first angle is formed by the cylinder axis and a vertical axis. A second angle is formed by the steering rod and the vertical axis. In accordance with the present invention, the first angle is greater than the second angle.

BRIEF DESCRIPTION OF THE DRAWINGS

In the following description and claims, the references to front and rear relate to the direction of travel of the vehicle. The invention will be described in conjunction with the following drawings in which like reference numerals designate like elements and wherein:

DETAILED DESCRIPTION OF PREFERRED EMBODIMENTS

Figure 1:
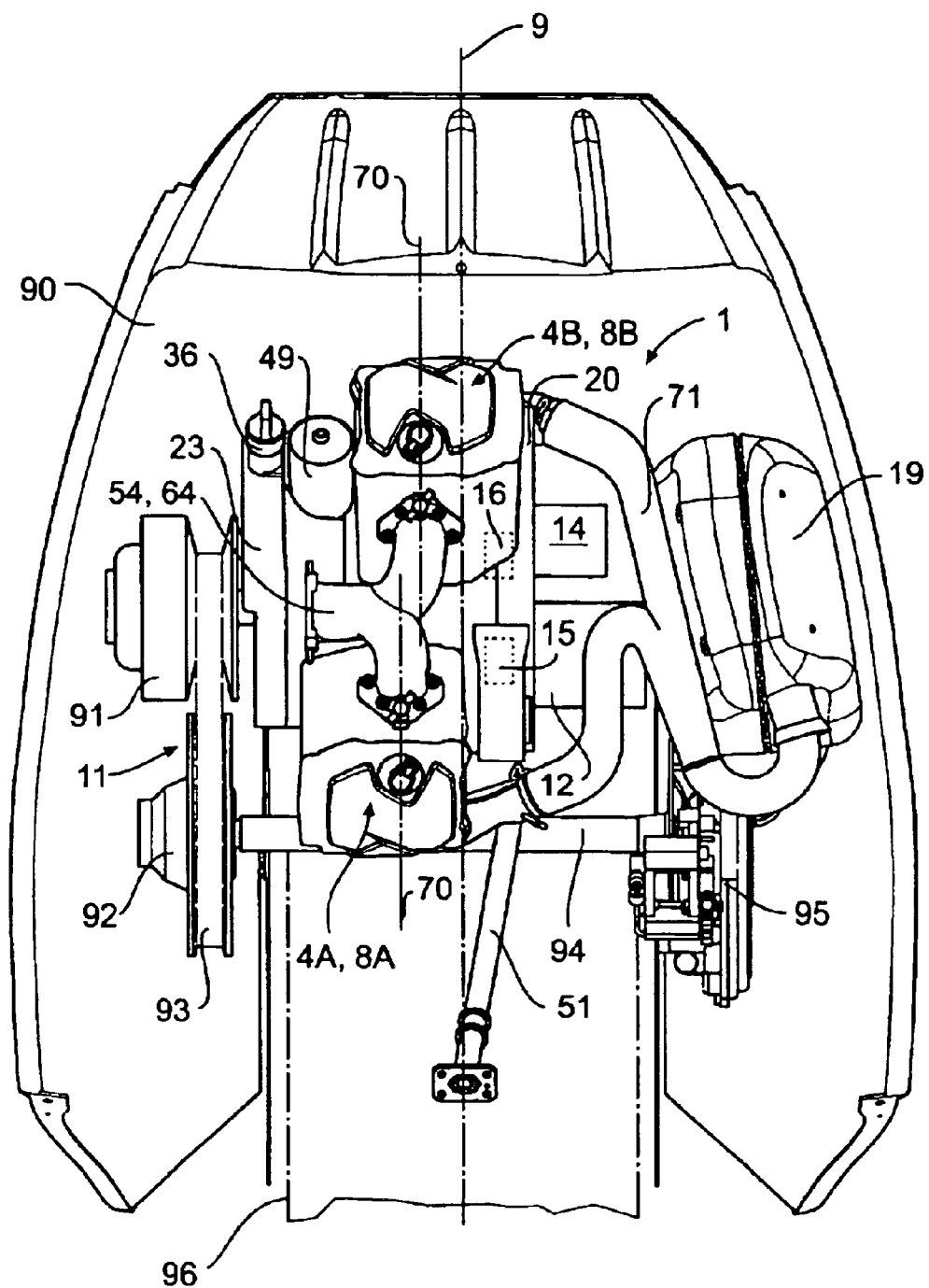
FIG. 1 is a top view of a four-cycle engine according to an embodiment of the present invention with an air box and the throttle assembly being omitted, wherein the four-cycle engine is illustrated within a snowmobile.
Figure 9:
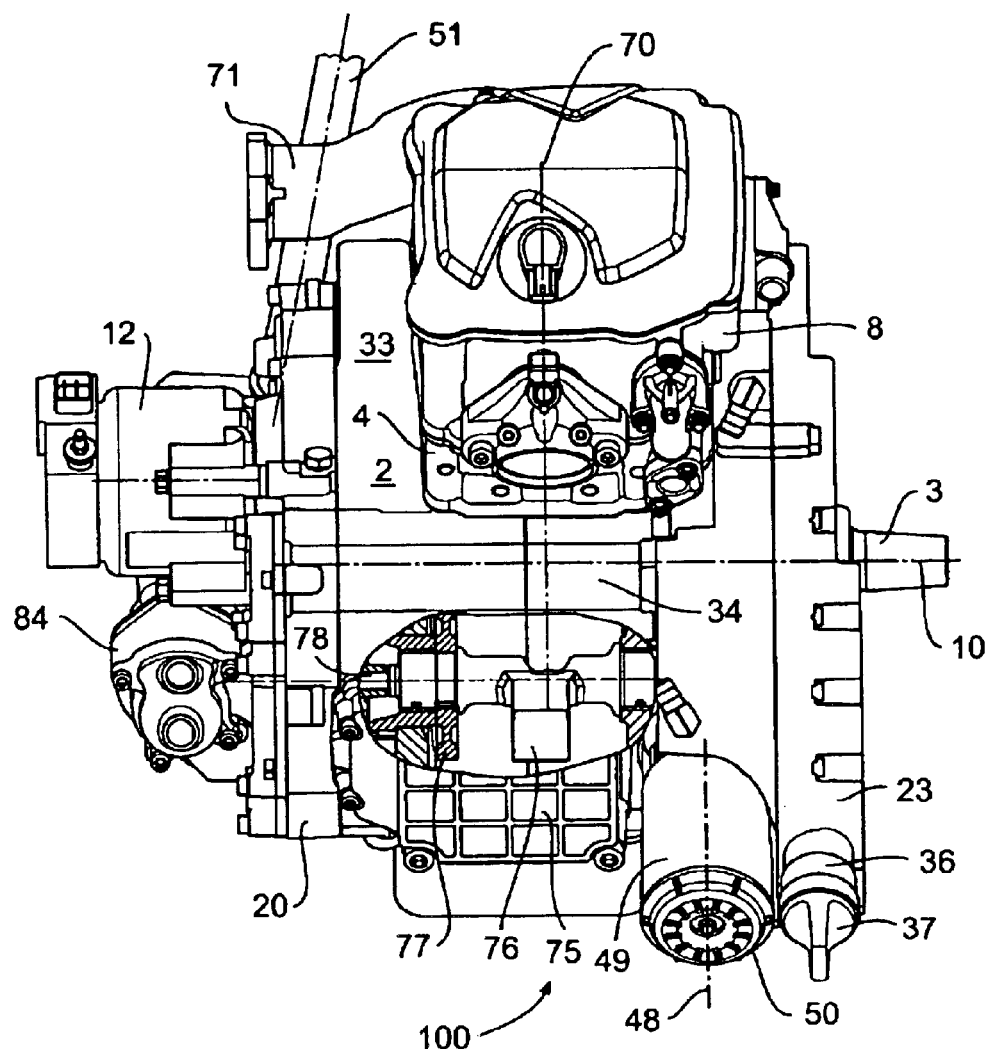
FIG. 9 is a top view of a single-cylinder engine in partial cross-section according to another embodiment of the present invention.

A four-cycle engine having one or more cylinders 4 will now be described in greater detail. A two cylinder engine 1 in accordance with the present invention is illustrated in FIG. 1. A single cylinder engine 100 in accordance with the present invention is illustrated in FIG. 9. As shown in FIG. 1, the engine 1 is mounted to a chassis of a snowmobile 90. The engine 100 may be similarly mounted in the chassis of the snowmobile 90. The present invention is not limited to four-cycle engines used in snowmobiles; rather, it is intended that the engines 1 and 100 disclosed herein and any variations thereof may be used in multiple vehicles including but not limited to three-wheeled vehicles, ATVs, motorcycles, and watercraft.

Figure 2:
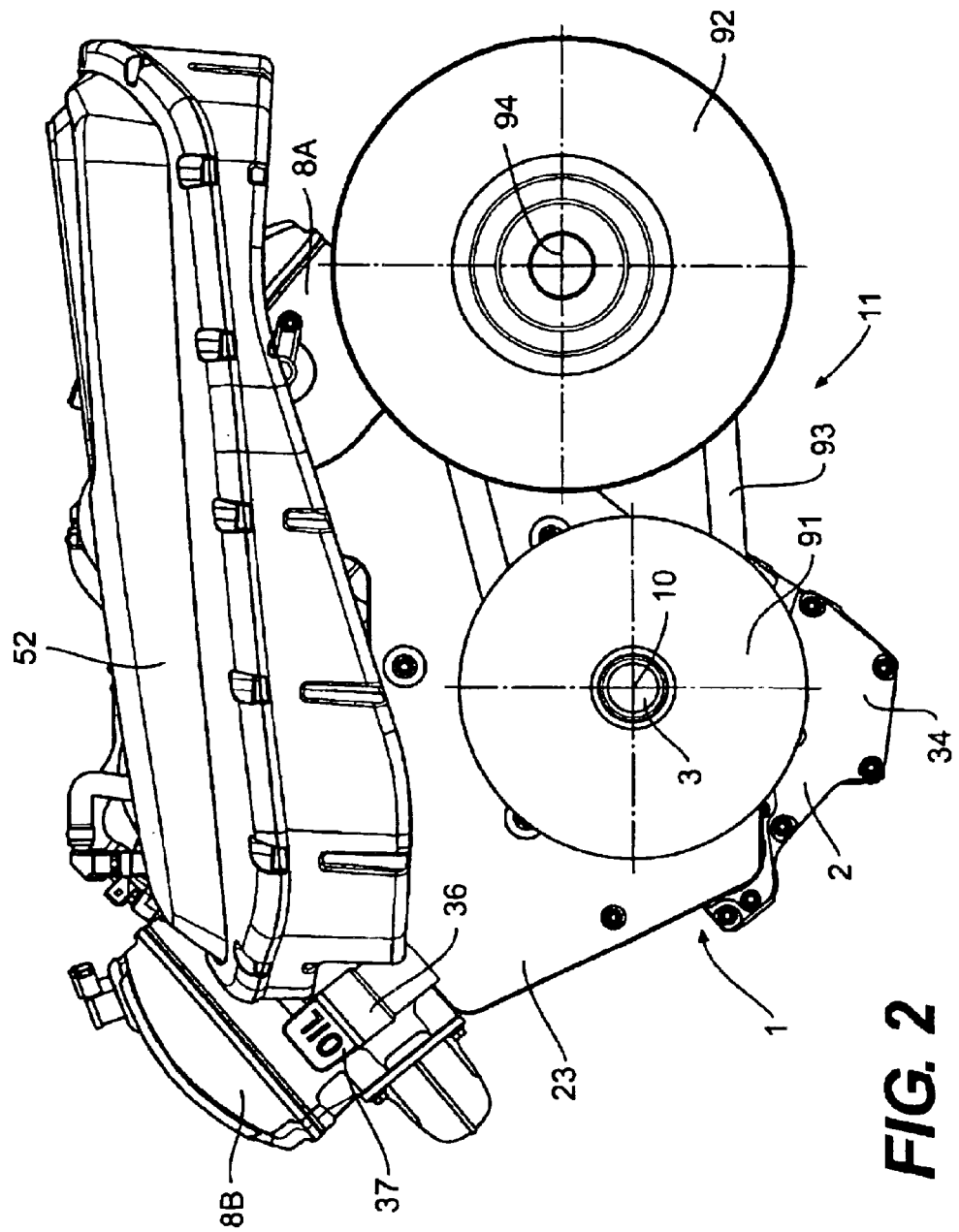
FIG. 2 is an end view of an output side of the engine of FIG. 1.
Figure 3:
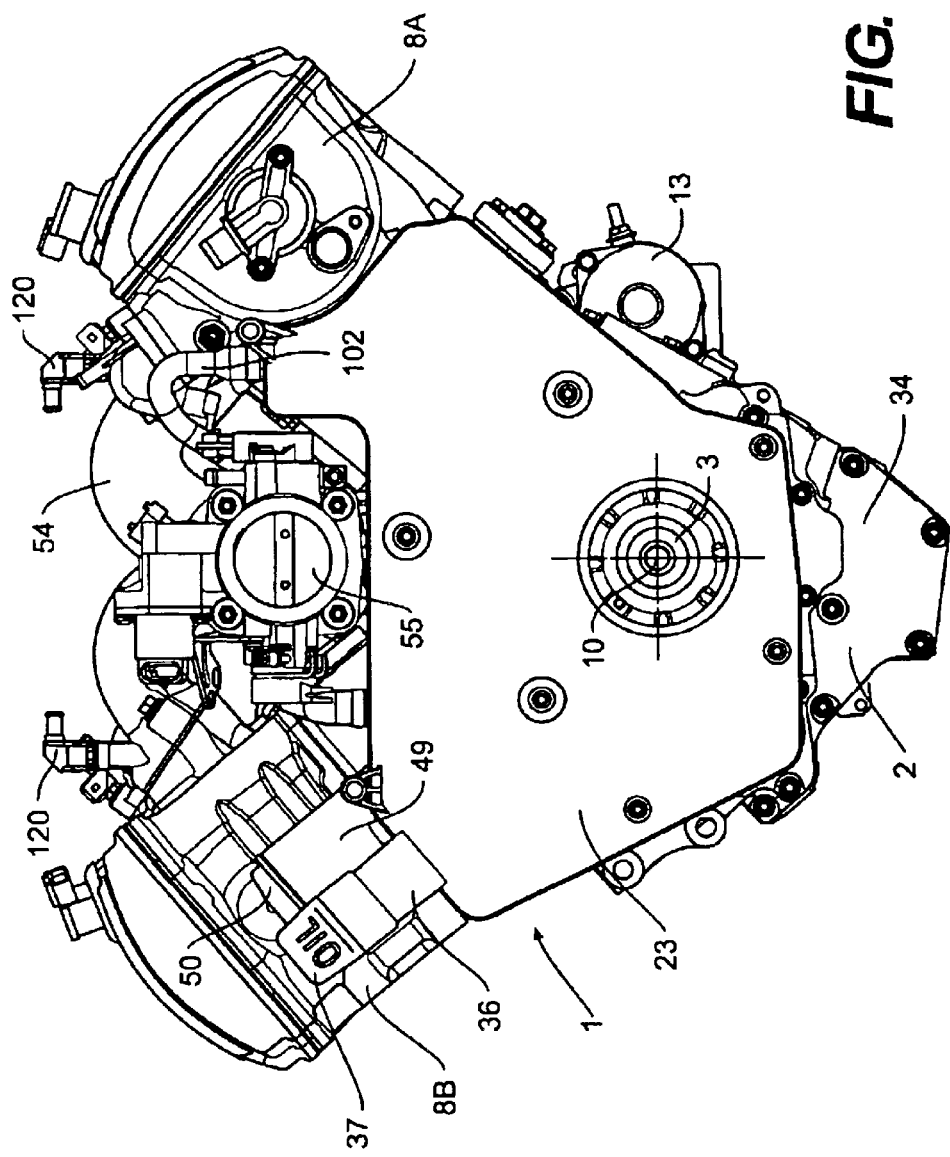
FIG. 3 is an end view of the output side shown in FIG. 2, wherein the continuously variable transmission (CVT) and the air box are omitted.

The four-cycle engine 1 having a pair of cylinders 4A and 4B will now be described in greater detail. Although a pair of cylinders 4A and 4B are disclosed, the present invention is not limited to a pair of cylinders; rather, it is contemplated that a single cylinder 4 may be provided, as described below in connection with FIGS. 9 and 10. It is further contemplated that more than two cylinders maybe provided (e.g. V-four cylinder engine). As shown in FIGS. 2 and 3, the engine 1 includes a crankcase 2 having a crankshaft 3 rotatably supported therein. The engine 1 further includes a pair of cylinders 4A and 4B that are arranged in a V configuration, as shown in FIGS. 3, 4, 5 and 8. The angle between the cylinders 4A and 4B is approximately 80°. Angles greater than 80° and less than 80° are considered to be well within the scope of the present invention. In order to locate the center of gravity of the engine 1 as close as possible to the middle of the snowmobile 90 or the track 96 and the same time to provide space for the steering rod 51, the cylinder axis 70 of the front cylinder 4B should be closer to the longitudinal axis 9 of the snowmobile 90 and the cylinder axis 70 of the rear cylinder 4A, so that the center of gravity of the engine 1 is moved as close as possible towards the longitudinal axis of the snowmobile 90.

Each of the cylinders 4A and 4B includes at least one inlet valve and at least one exhaust valve, which are located within the cylinder heads 8A and 8B, respectively. A pair of inlet valves and a pair of exhaust valves associated with each cylinder 4A and 4B is preferred.

Figure 4:
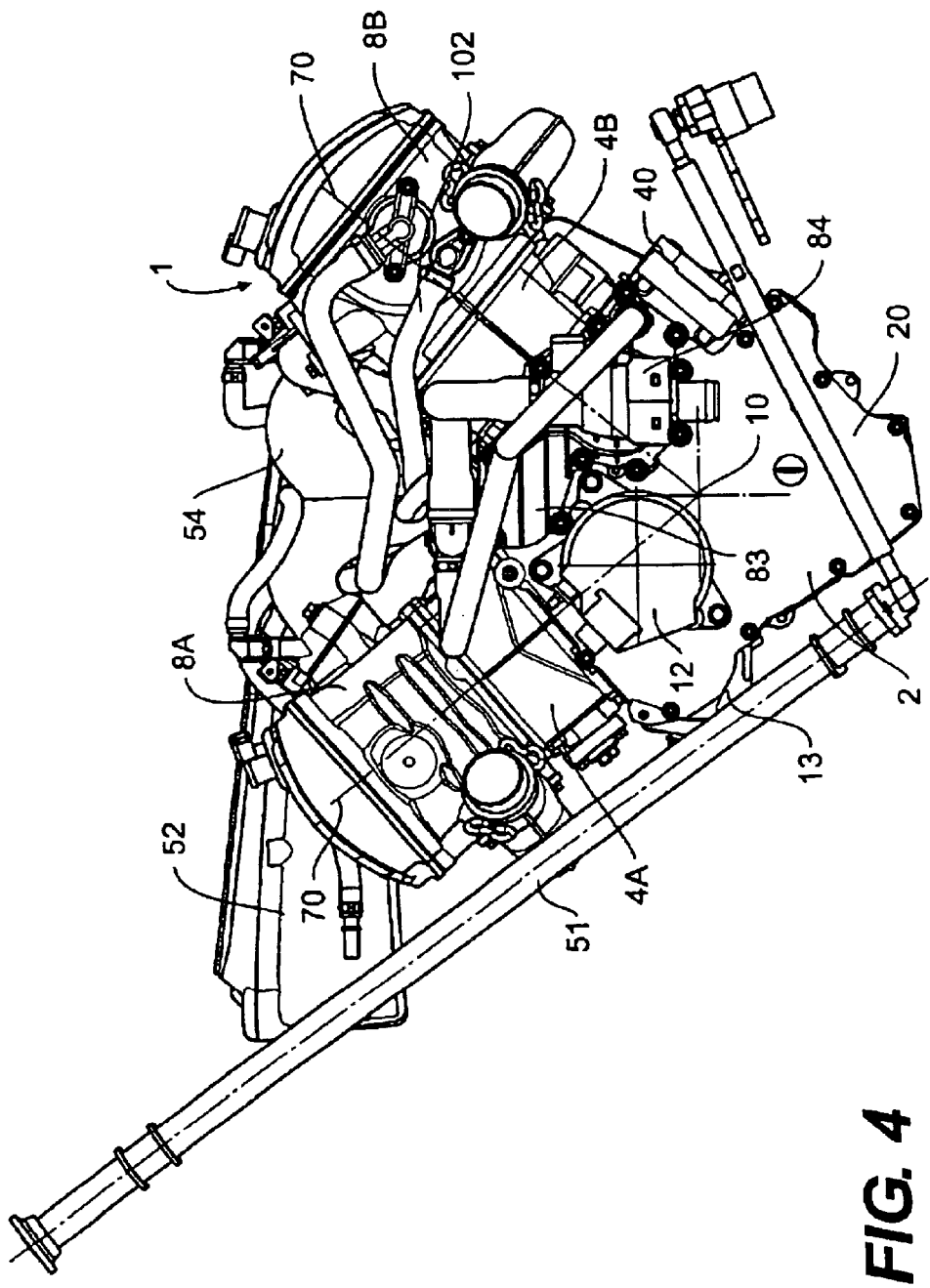
FIG. 4 is an end view of the engine of FIG. 1 opposite the output side, as shown in FIG. 2.
Figure 12:
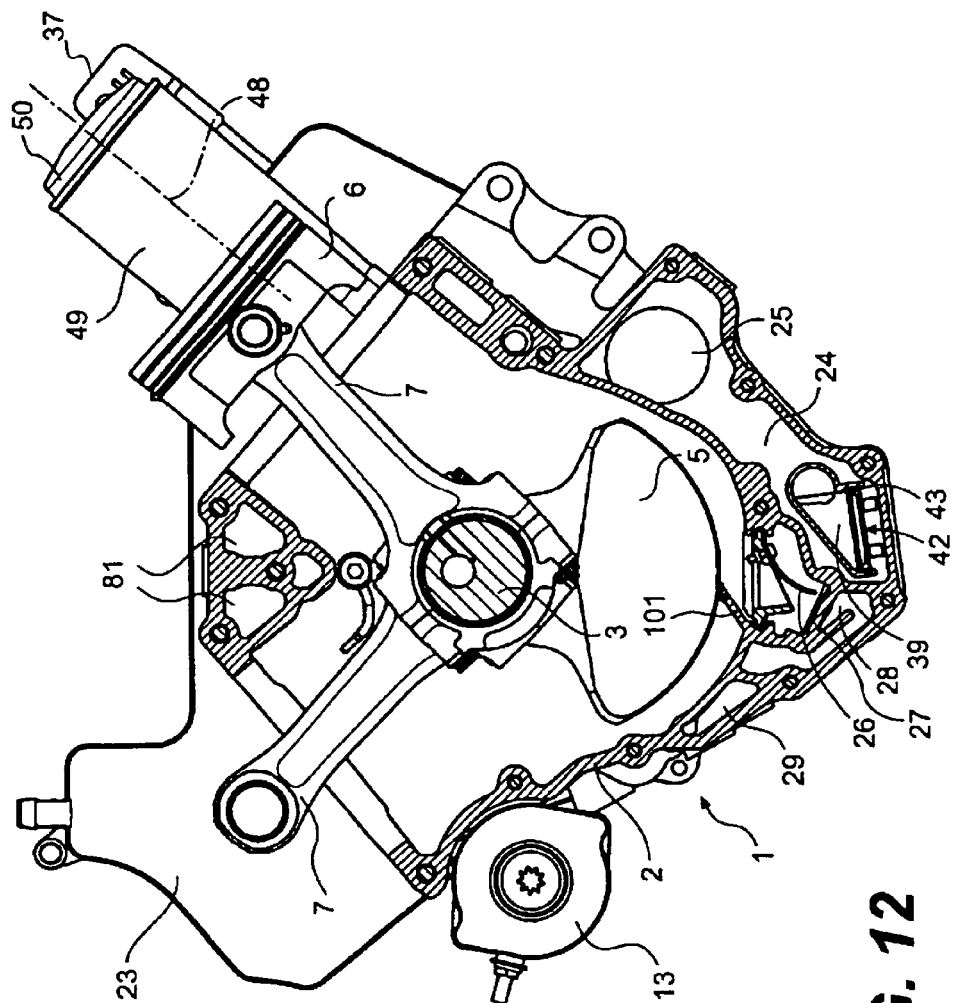
FIG. 12 is a cross sectional view of the engine of FIG. 1 through the crankcase, transverse to the crankshaft.

The crankcase 2 includes a drive-side or output side section 34 and a second side section 33, as shown in FIG. 4. The sections 33 and 34 together form a crankshaft chamber 5 that encloses the crankshaft 3. The crankshaft 3 extends from opposite ends of the crankshaft chamber 5. Each of the cylinders 4A and 4B includes a piston 6 movably mounted therein. The piston 6 is operatively connected to the crankshaft 3 by a connecting rod 7, as shown in FIG. 12. The reciprocating movement of the pistons 6 is converted into a rotary movement at the crankshaft 3.

The intake and exhaust valves of each cylinder are actuated by a single overhead camshaft (SOHC) (not shown) located within the cylinder heads 8A and 8B. The cams on the camshaft may directly operate the valves or indirectly operate the valves through rocker arms. The camshaft is operatively connected to the crankshaft 3 by way of a chain-drive system. The present invention, however, is not limited to the use of a single camshaft and rocker arms to operate the valves. It is, of course, understood that any other type of valve operating system such as DOHC and/or a camshaft driven by way of a notched belt could be used, without departing from the underlying concept of the present invention.

The arrangement of the engine 1 will now be described. As shown in FIG. 1, the four-cycle engine 1 may be installed in a snowmobile adjacent to a steering rod 51. The engine 1 is arranged such that the axis 10 of the crankshaft 3 is transverse to the longitudinal axis 9 of the snowmobile. The rear cylinder 4A is located adjacent the steering rod 51. The cylinder axis of the front cylinder 4B is located closer to the longitudinal axis 9 of the snowmobile than the cylinder axis of the rear cylinder 4A.

Figure 7:
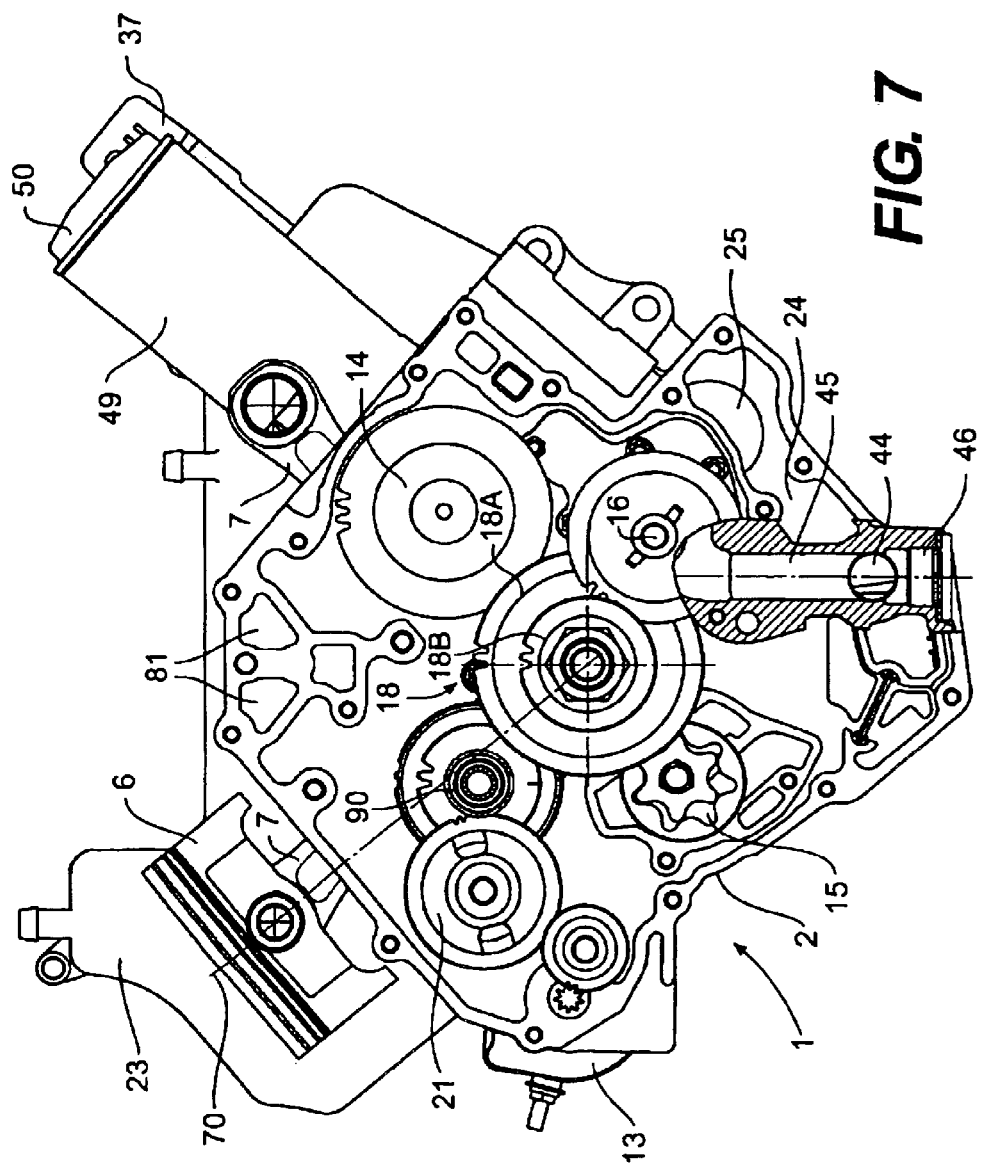
FIG. 7 is an end view of the engine shown in FIG. 4 having a secondary housing omitted.
Figure 8:
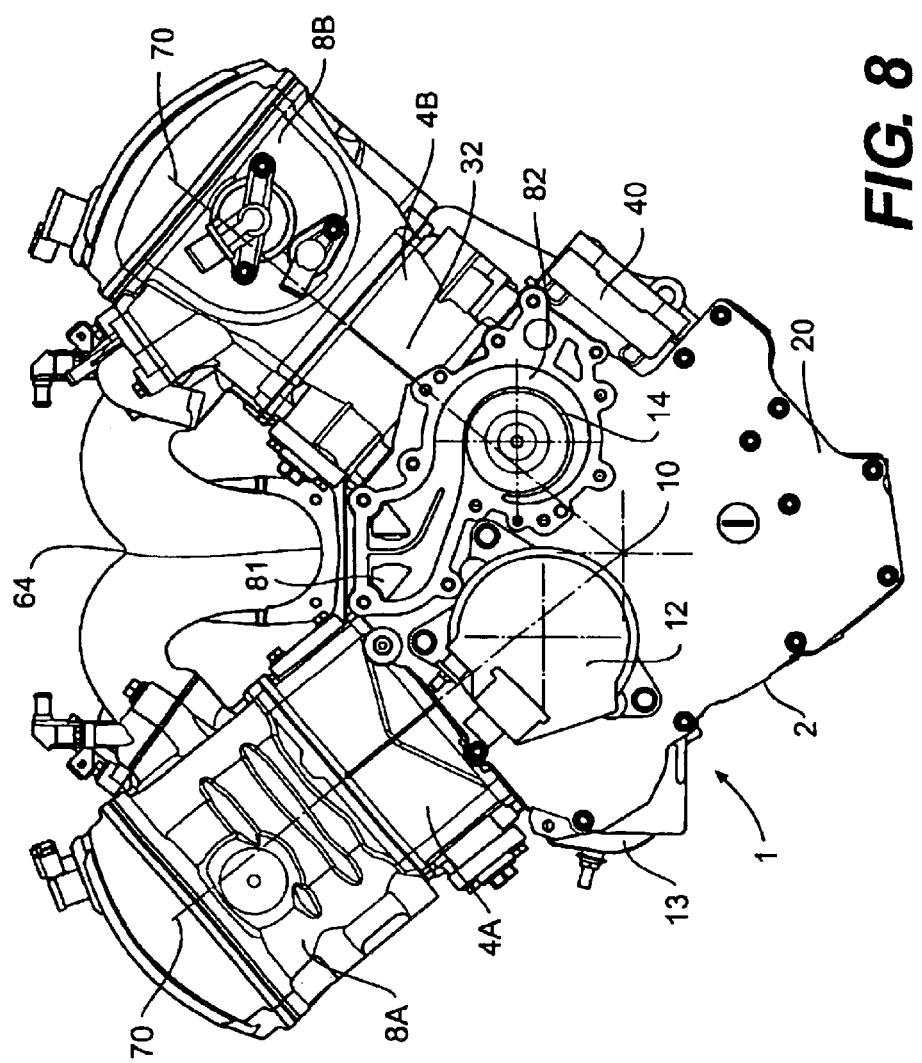
FIG. 8 is an end view of the engine illustrated in FIG. 4 having the water pump housing omitted.
Figure 17:
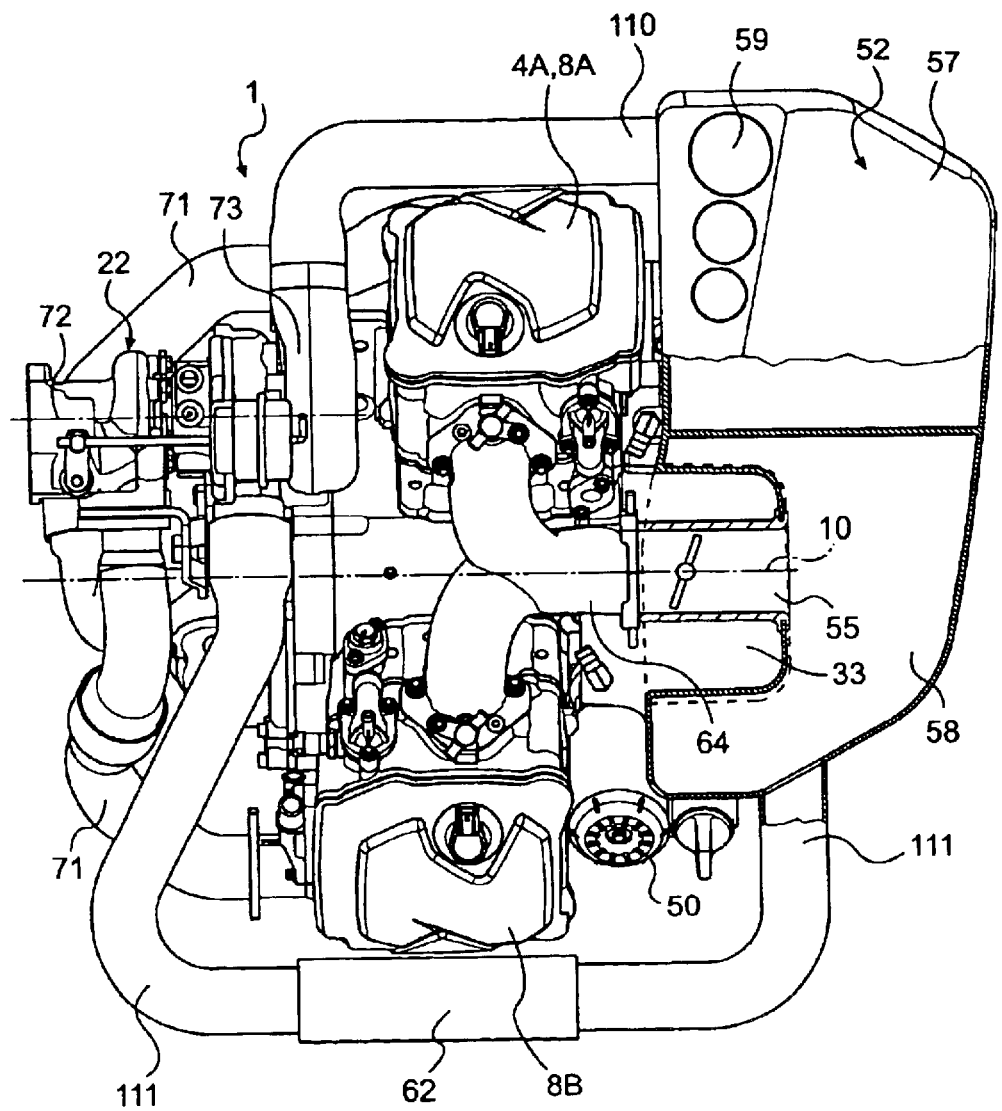
FIG. 17 is a top view of a turbocharged version of the engine illustrated in FIG. 1 illustrating the induction and exhaust systems.
Figure 18:
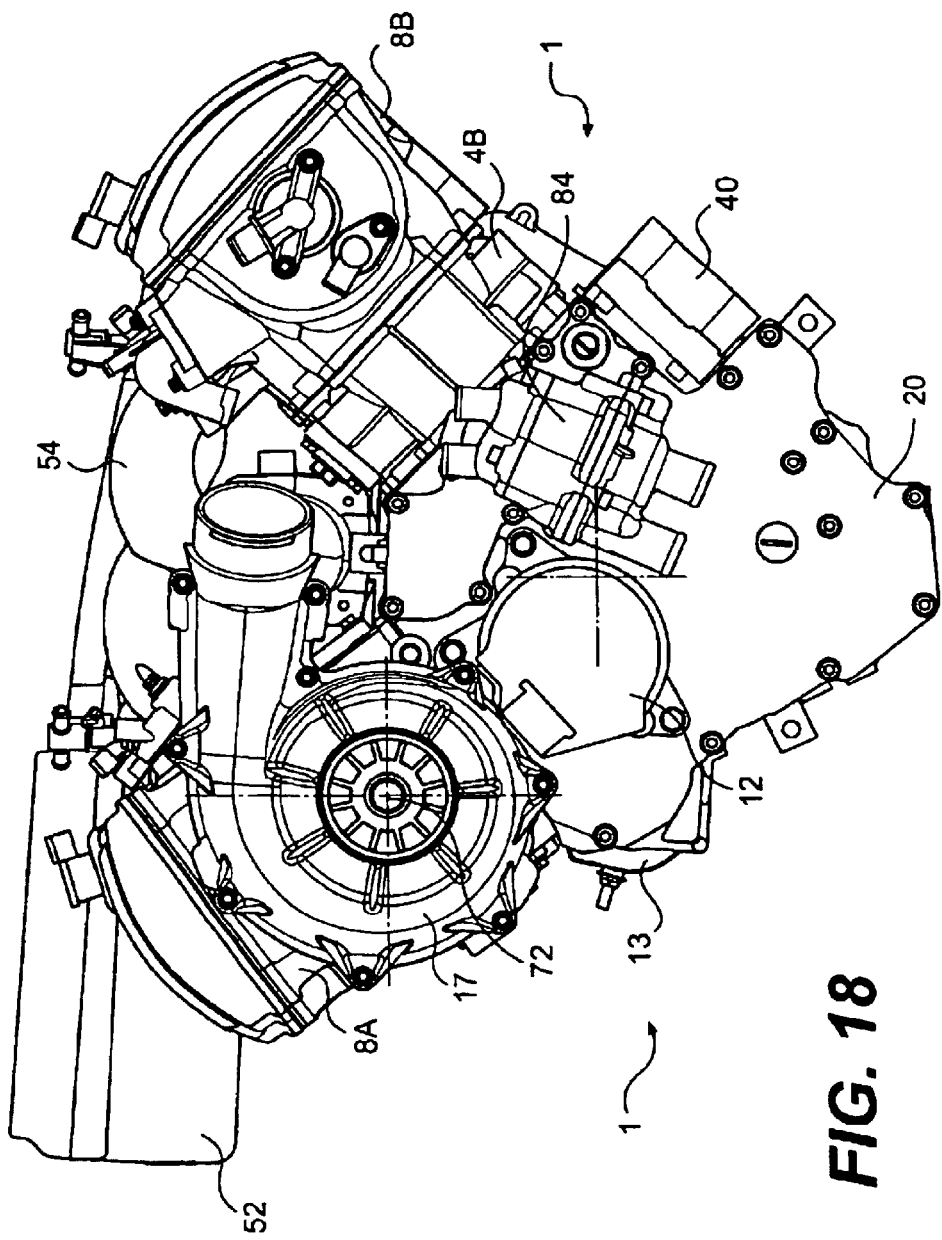
FIG. 18 is an end view of the supercharged version of engine of FIG. 1 illustrating a centrifugal blower.

A CVT 11 is supported on the engine 1, as shown in FIG. 2, on one side of the longitudinal axis 9. The CVT 11 is driven by the crankshaft 3. A plurality of auxiliary units, shown in FIGS. 1 and 4 and described below, are supported on an opposite side of the engine 1 on an opposite side of the longitudinal axis 9. Relative to the CVT 11, the auxiliary units are located on the opposite side of the longitudinal axis 9 of the snowmobile 90. As shown in FIGS. 8, 17 and 18, the auxiliary units include but are not limited to an alternator or generator 12, a starter motor 13, a water pump 14, at least two oil pumps including a suction pump 15 and a force pump 16, and an optional charger. The charger may either be a mechanical supercharger 17 or a turbocharger 22. The alternator 12, the starter motor 13 and the optional supercharger 17 or turbocharger 22 are arranged with their centers of gravity on the same side of the axis 10 of the crankshaft 3 on the rear engine side. The auxiliary units (except the turbocharger 22) are driven by a common drive unit operatively connected to the crankshaft 3. It is preferable that the common drive unit is a toothed wheel gearing 18, as shown in FIG. 7. The use of common drive unit produces a particularly compact construction for the engine 1. It is advantageous to have the starter motor 13 arranged to the rear of the axis 10 of the crankshaft 3, which locates the resultant center of gravity of the engine even further towards the rear of the snowmobile. The CVT 11 and the auxiliary units will now be described in greater detail.

Figure 5:
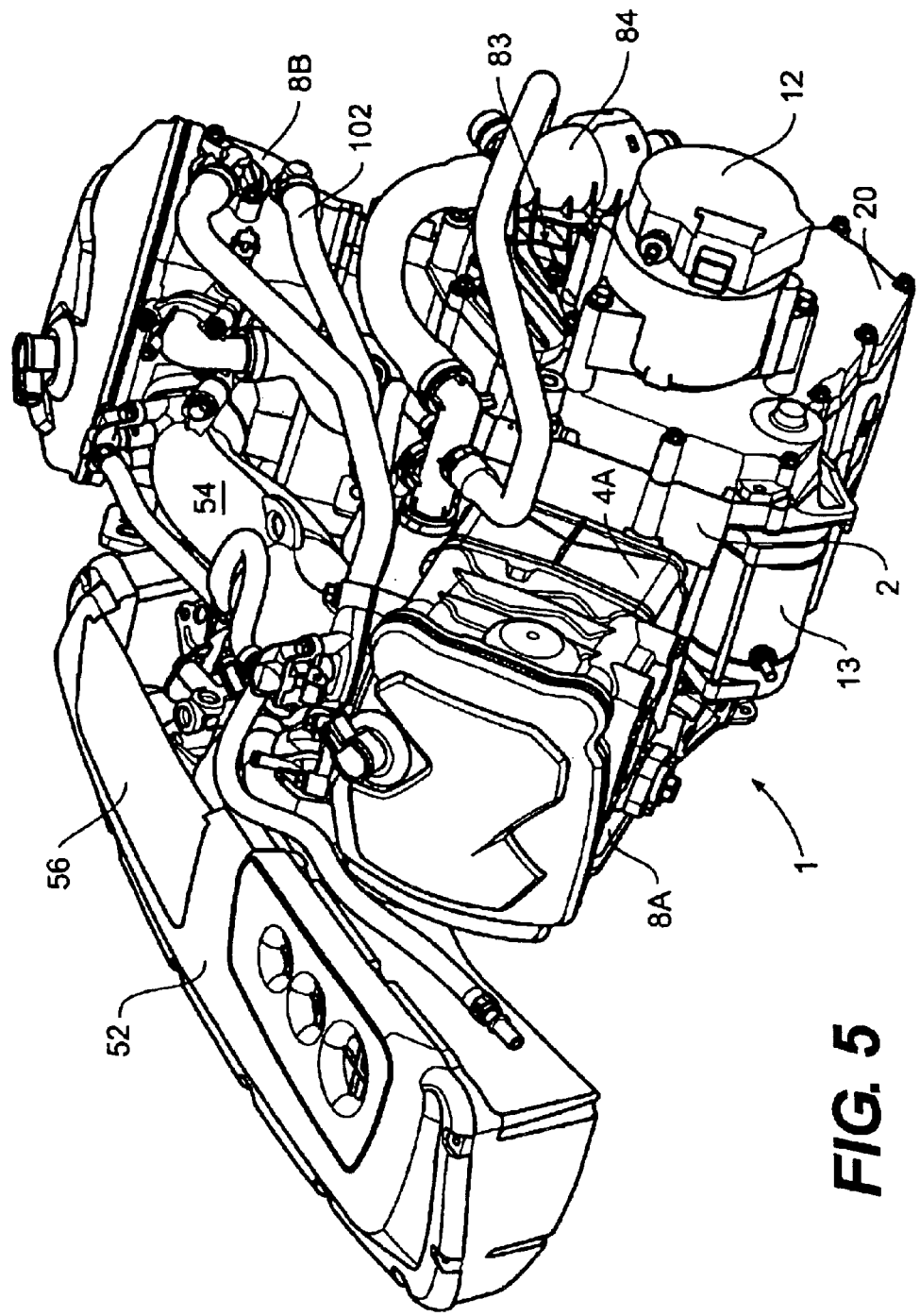
FIG. 5 is a perspective view from the right rear side of the engine of FIG. 1.
Figure 6:
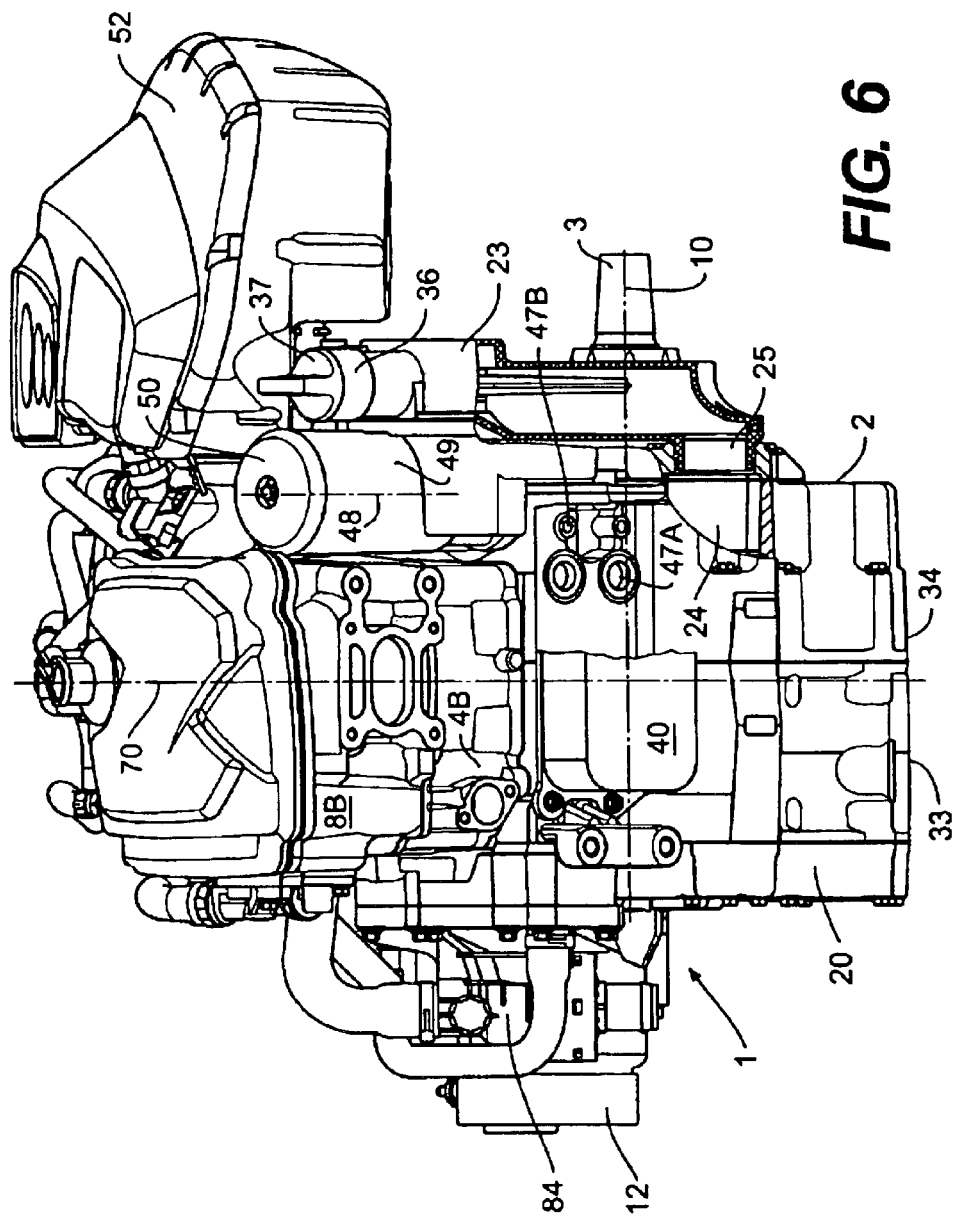
FIG. 6 is a front view of the engine, in partial cross section.

The toothed-wheel gearing 18 is accommodated in a secondary housing 20 that is located on the end of the second section 33 of the crankcase 2 to protect the gearing 18 from the external environment. As illustrated in FIGS. 4–6, the secondary housing 20 protects the toothed-wheel gearing 18 from environmental influences. The water pump 14 and the generator 12 are mounted on the exterior of the secondary housing 20. Their respective drive shafts pass through the secondary housing 20 and mesh with the toothed-wheel gearing 18. The suction pump 15 and the force pump 16 are located within the secondary housing 20. All of these components are located on a side of the engine opposite the CVT 11.

The generator 12 is preferably connected to the toothed-wheel gearing 18 through a dynamic damper to damp out excessive oscillations associated with the great inertial moment of the generator 12. The generator 12 is driven by a gear wheel 18A of the toothed-wheel gearing 18 that is arranged on the crankshaft 3 in the secondary housing 20, as shown in FIG. 7. The drives for the water pump 14 and for the starter motor 13 also mesh with the same gear wheel 18A. The starter motor 13 is coupled to the driving gear wheel 18A and thus to the crankshaft 10 through a plurality of intermediate gear wheels in order to arrive at the required transmission ratio. The starter motor 13 is connected through a slip clutch 21 to the crankshaft to compensate for torque peaks. The suction pump 15 and the force pump 16, are driven through the driving gear wheel 18B of the toothed-wheel gearing 18.

The water pump 14 delivers engine coolant through the coolant channels 81 within the engine 1, shown in FIGS. 7 and 8. The water pump 14 includes a spiral housing 82, shown in FIG. 8 and an outer housing 83, shown in FIG. 4. The housing 83 forms connecting pieces for coolant feed and return lines and incorporates a thermostat 84, which is shown in FIG. 4. The thermostat 84 controls the flow of coolant.

A heat exchanger (not shown) is preferably arranged between the engine 1 and the track 96 in such a manner that when the snowmobile 90 is operated, snow or ice crystals are continuously thrown against the heat exchanger when the snowmobile track 96 is moving. This provides a simple yet highly effective means for cooling the engine without the need for any costly components.

As shown in FIG. 2, the CVT 11 comprises, amongst other things, a drive pulley 91 and driven pulley 92. The drive pulley 91 is secured to the crankshaft 3. The driven pulley 92 is secured to one end of an output shaft 94 that is supported by the chassis 90 of the vehicle. The drive pulley 91 and driven pulley 92 are operatively connected by a belt 93. The transmission ratio between drive pulley 91 and driven pulley 92 is variable as a function of the load on the engine and engine speed. A reduction gear assembly 95 is connected to an opposite end of the output shaft 94, as shown in FIG. 1. The reduction gearing 95 drives the track 96 of the snowmobile.

Figure 19:
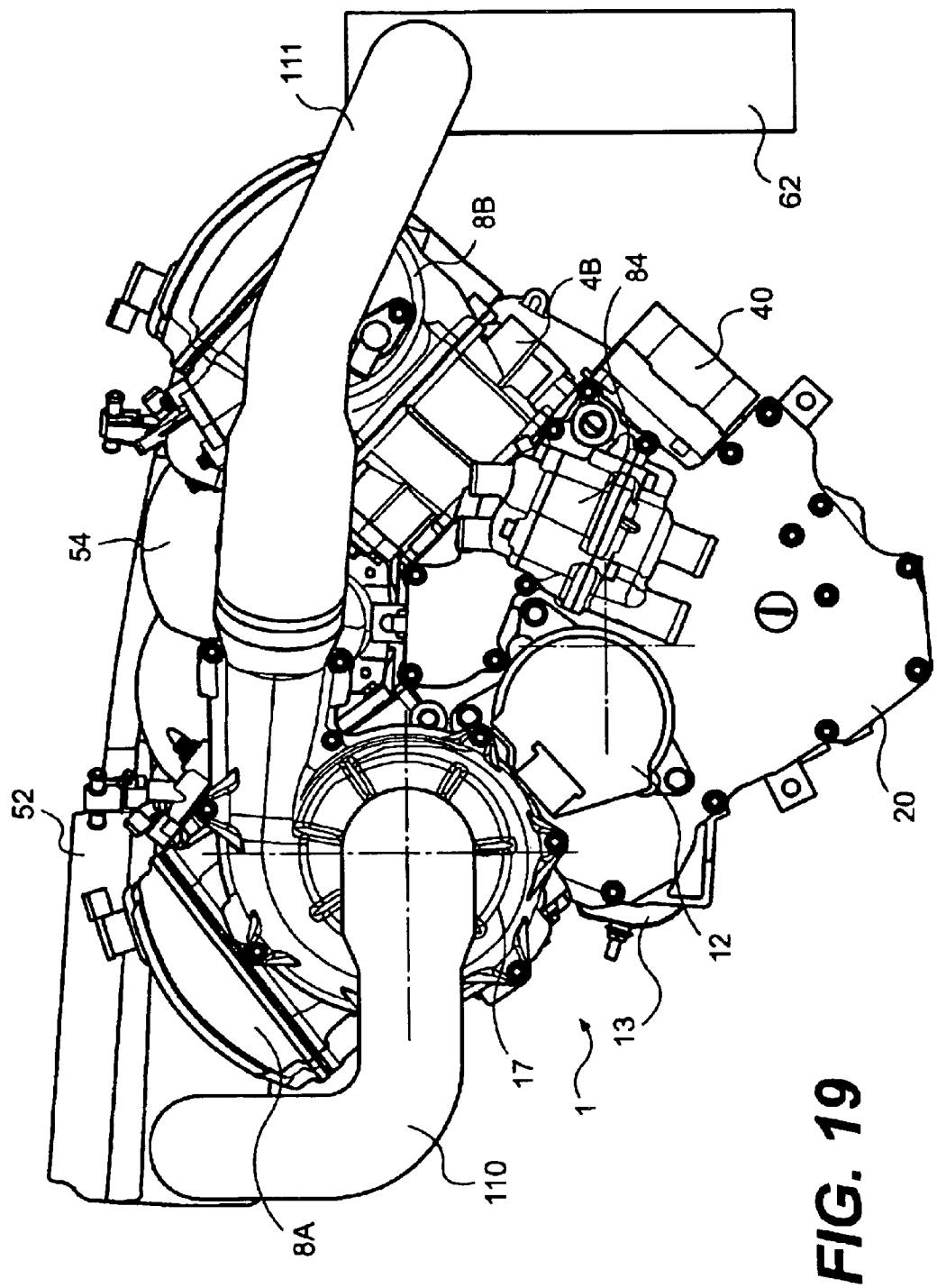
FIG. 19 is the end view shown in FIG. 18 illustrating the induction system ducts.

A supercharger or turbocharger can be used to compress the intake air and increase the cylinder charge. As shown in FIGS. 18 and 19, the supercharger 17 is preferably a centrifugal blower. The supercharger 17 is driven by the crankshaft 3 through the gearing 18. The supercharger 17 is located on a side of the engine 1 that is opposite the CVT 11. The supercharger 17 is located adjacent the rear cylinder 4A. The axis 72 of the supercharger 17 is located parallel to and behind the axis 10 of the crankshaft 3. Since the supercharger 17 is relatively heavy, it advantageously serves as a counterweight to the CVT. This arrangement improves both the handling and balance of the snowmobile 90. This location of the supercharger 17 requires relatively short ducts for connection to the induction system.

Alternatively, a turbocharger 22 can be provided to improve the power output of the engine 1 instead of the mechanically driven supercharger described above. The turbocharger 22 is connected to the exhaust system. Like the supercharger 17, the turbocharger 22 is mounted on the opposite side of the longitudinal axis 9 of the snowmobile 90 relative to the CVT 11. With this arrangement, the axis 72 of the turbocharger impeller is behind the axis 10 of the crankshaft 3, adjacent to the cylinder 4A. The turbocharger 22 acts as a counterweight to the CVT 11.

The induction system for the engine 1 will now be described. To configure the exchange of gases for the V-twin four cycle engine 1 in as simple a manner as possible, the inlet ports into the cylinder heads 8A and 8B are arranged on opposing sides of the cylinder heads 8A and 8B such that the inlet ports on cylinder head 8A face the inlet ports on cylinder head 8B, as shown in FIG. 8. The exhaust manifolds associated with each cylinder 4A and 4B are arranged on the opposing sides of the cylinders such that the exhaust ports on cylinder head 8A face away from the exhaust ports on cylinder head 8B.

Figure 20:
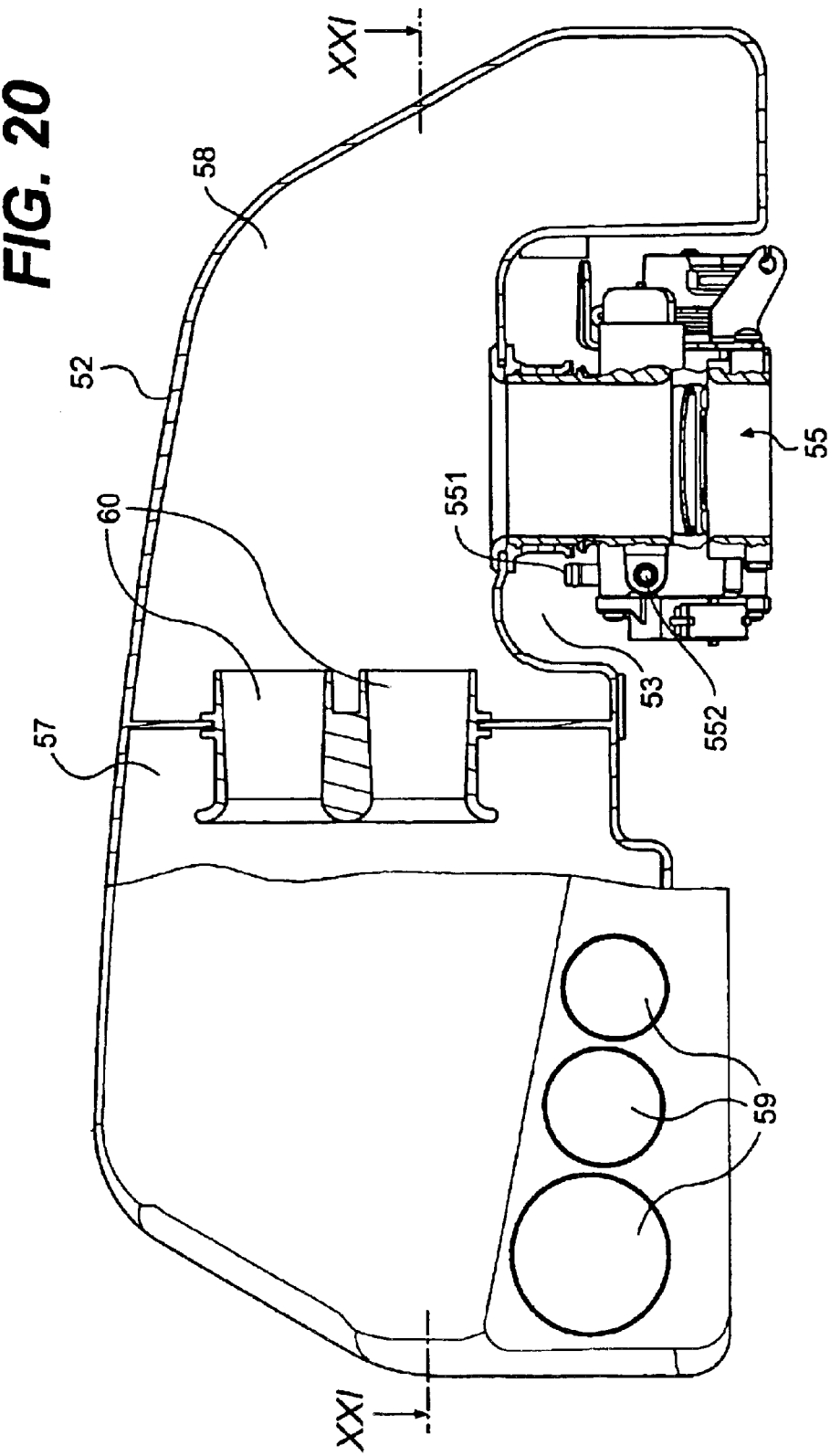
FIG. 20 is a partial cross sectional view of the air box according to the present invention.
Figure 21:
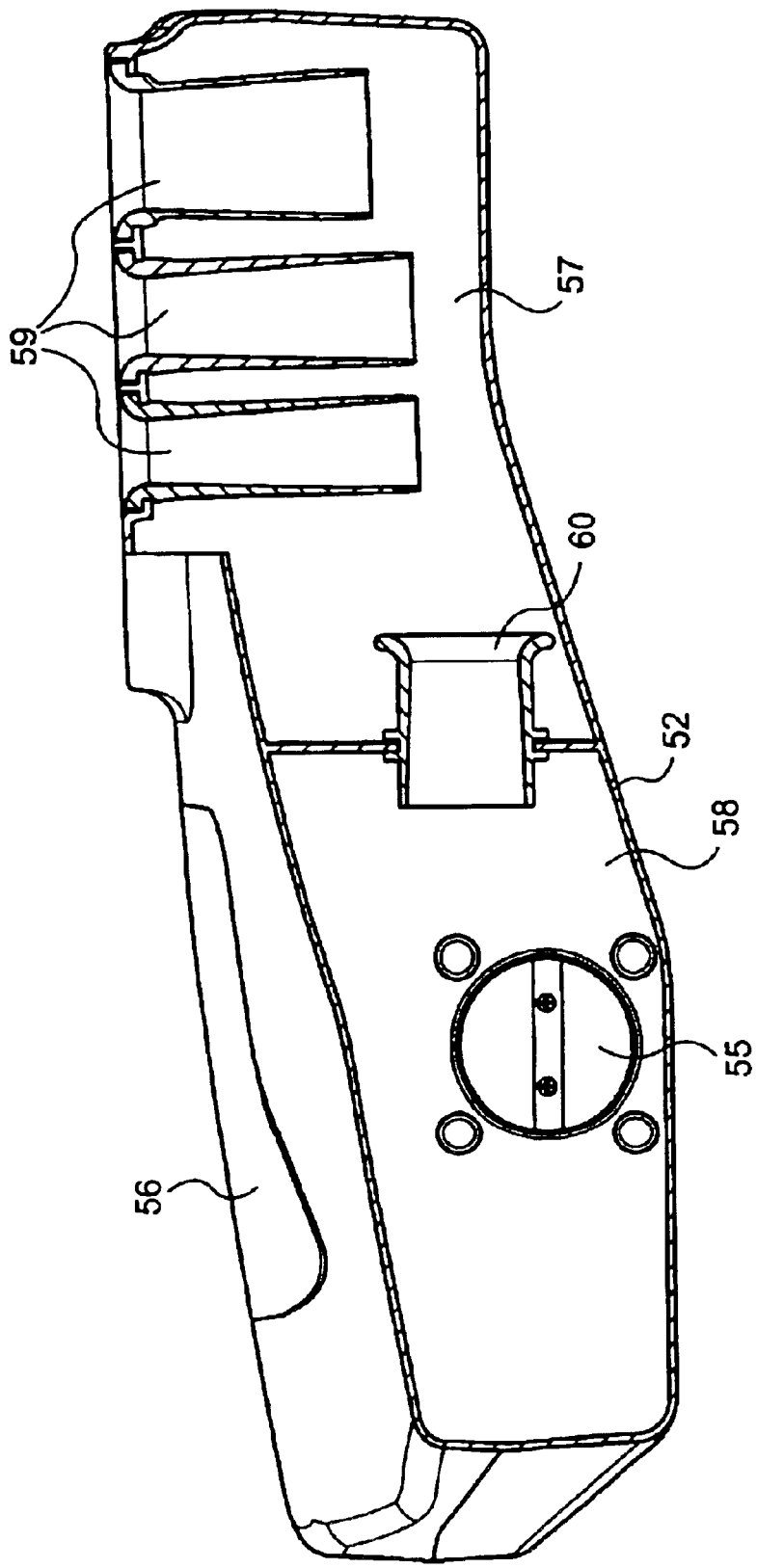
FIG. 21 is a cross sectional view of the air box along section lines XXI—XXI in FIG. 20.

Air and blow-by gas is drawn in through an air box or plenum 52, which is advantageously arranged on the same side of the engine 1 as the CVT 11, as shown in FIGS. 2, 5 and 6. The air box 52 is illustrated in greater detail in FIGS. 20 and 21. The air box 52 serves to equalize pressure waves and attenuate sound waves. A throttle assembly 55 is installed in a recess 53 that is formed in the air box 52, as shown in FIG. 20. The throttle assembly 55 is operatively connected to an intake manifold 54. The air and unburned gas mixture is supplied to the cylinder heads 8A and 8B and subsequently to the cylinders 4A and 4B by way of the intake manifold 54. To protect the throttle assembly 55 against dirt, the recess 53 in the air box 52 is covered from above by a removable cover 56, shown in FIG. 21.

As discussed above, the snowmobile 90 is typically operated in severe working conditions (e.g., as low as −40° C.). Under such conditions, icing around the throttle assembly 55 can occur, which could have an adverse impact on engine performance. Furthermore, at full loads, the velocity of air around the throttle assembly can also increase ice build up. In accordance with the present invention, a portion of the engine coolant is directed through a portion of the throttle assembly 55. The coolant is fed through an inlet opening 551 through a passageway (not shown) to an outlet opening 552, as shown in FIG. 20. Although the passageway typically only extends through a small portion of the throttle assembly 55, the heat transfer properties of the material forming the throttle assembly are sufficient such that the coolant warms substantially the entire throttle assembly to prevent ice formation.

The air box 52 is arranged above the CVT 11 and incorporates at least two separate chambers 57 and 58. The first chamber 57 of the air box 52 communicates with the atmosphere through openings 59 formed therein through which air is drawn into the induction system.

In the event that the engine 1 is a naturally aspirating engine (i.e., no turbocharger or supercharger), the first chamber 57 is connected to the chamber 58 through venturi tubes 60, which attenuate induction noise. Air is first drawn into the first chamber 57 and then through the venturi tubes 60 into the second chamber 58. The air is then routed through the throttle assembly 55 into the intake manifold 54 to the cylinder heads 8A and 8B into the cylinders 4A and 4B.

In the event that the engine 1 is a charged engine (i.e., turbocharged or supercharged), air is drawn into the first chamber 57 through the openings 59. There are no venturi tubes 60 in the air box 52. Unlike the naturally aspirating engine, the two chambers 57 and 58 are no longer connected directly to each other. The turbocharger or supercharger draws air from the first chamber 57 by way of a suction line 110, as shown in FIGS. 17 and 19. The charger then compresses the air and returns the air to the second chamber 58 through a pressure line 111, as shown in FIGS. 17 and 19. The second chamber 58 acts as an equalizer tank. The pressure in the chamber 58 is higher than the pressure in the chamber 57 and corresponds to the charge pressure. The compressed air then passes through the second chamber 58 into the throttle assembly 55 to the intake manifold 54 where it is delivered to the cylinders 4A and 4B. The same air box 52 can be used in either the aspirated version of the engine or the charged version of the engine with only minor modification.

It is preferable that the suction line 110 is routed around the rear cylinder 4A and the cylinder head 8A. It is preferable that the pressure line 111 is routed around the front cylinder 4B and the cylinder head 8B of the engine. The suction line 110 and the pressure line 111 are preferably formed as flexible hoses and/or rigid pipes. The present invention, however, is not limited to the use of hoses and/or pipes; rather, it is contemplated that the lines 110 and 111 may be at least partially integrated into the crankcase 2 or air box 52. A charge-air cooler or intercooler 62 may be integrated into the pressure line 111 to cool the charge air. The cooler 62 has a relatively low weight and is preferably located in front of the axis 10 without adversely impacting the center of gravity. Furthermore, this location aids in cooling the air because it is exposed to wind during operation of the vehicle.

In the turbocharged version of the engine 1, the suction line 110 is connected to deflector housing 73, which redirects the air flow into the turbocharger 22 through an angle of 90°, so that the compressor impeller is acted upon by the air flow in an axial direction. There is limited space within the vehicle between the engine and the frame, the use of the deflector housing reduces the overall length of the turbocharger. As shown in FIG. 17, the turbocharger 22 is on a side of the engine 1 opposite the CVT 11 and the airbox 52. The axis 72 of turbocharger 22 is oriented so as to be essentially parallel to and behind the axis 10 of the crankshaft 3.

Figure 25:
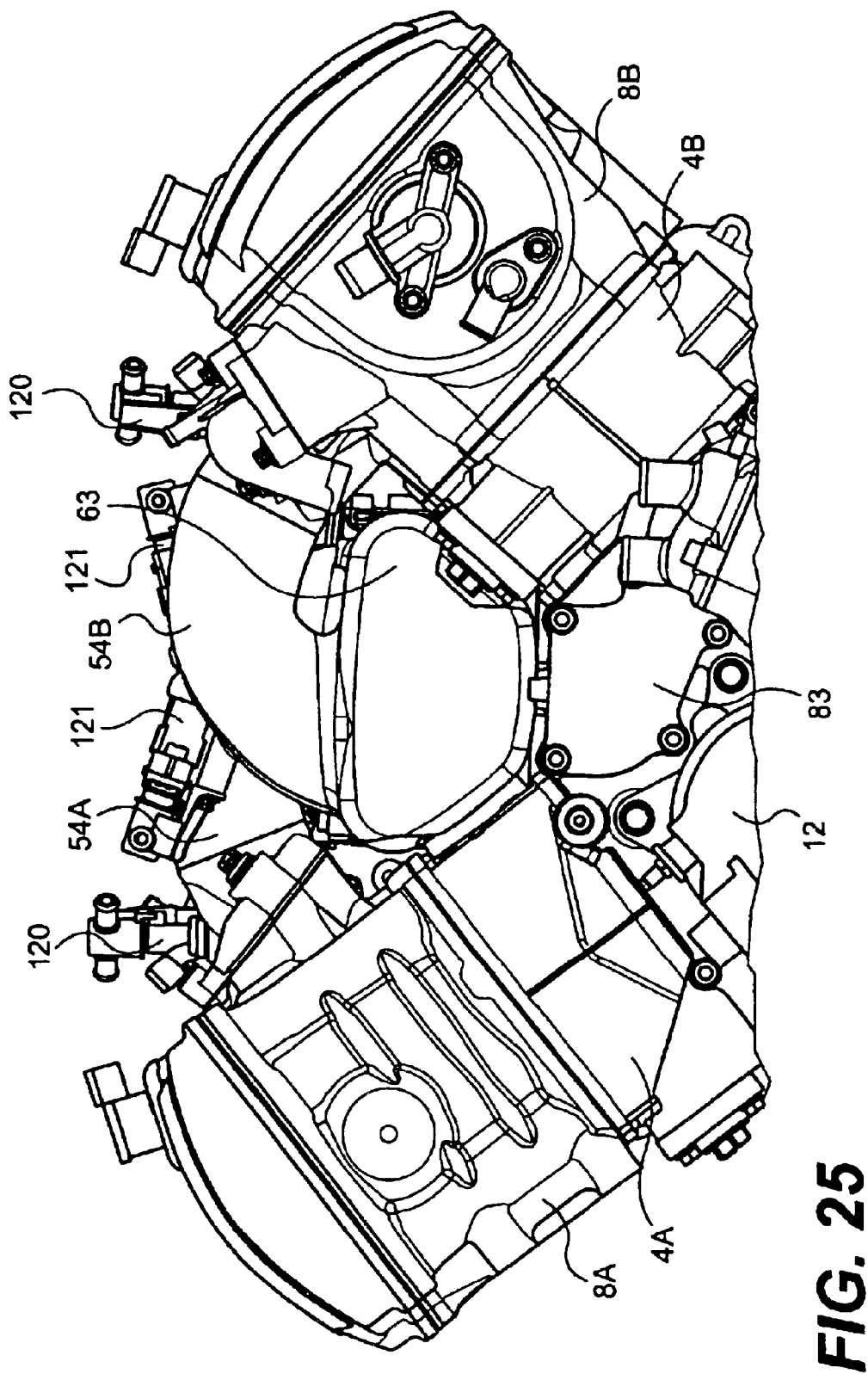
FIG. 25 is a partial end view of a variation of the engine of FIG. 1 having increased capacity.

In the event that additional capacity is required in the induction system, a surge tank 63 may be located in the space between the cylinders 4A and 4B, as shown in FIG. 25. Locating the surge tank 63 between the space formed by the angled cylinders 4A and 4B provides for additional capacity without increasing the space required for the engine. One side of the surge tanks 63 is connected to the throttle assembly 55. The top side of the surge tank 63 opens into rising manifolds 54A and 54B. Manifold 54A is operatively connected to the cylinder head 8A. Manifold 54B is operatively connected to cylinder head 8B.

In order to ensure that the cylinders 4A and 4B of the V-twin engine 1 are equally supplied with a homogenous mixture of air and fuel gas and that the cylinders are equally charged, the intake manifold 54 is preferably configured as a Y-shaped manifold 64, as shown in FIGS. 8, 11, 17 and 22–24. The air flows into the main branch 65 of the Y-manifold 64 from the air box 52 and is divided equally between two secondary branches 66. One branch 66 is operatively connected to the cylinder 4A through the cylinder head 8A. Another branch 66 is operatively connected to the cylinder 4B through the cylinder head 8B. The main branch 65 of the Y-shaped manifold 64 is essentially parallel to the axis 10 of the crankshaft 3.

The Y-shaped manifold 64 has excellent flow characteristics and generates little air turbulence within the manifold 64. This is especially important when each cylinder has two or more intake valves. The Y-shaped manifold 64 offers significant benefits over conventional curve intake manifolds. Intake manifolds that follow a curved path to the cylinder heads will often admit unequal quantities of the homogenous mixture into the cylinder. This uneven admission is caused by the centrifugal forces that are generated in the intake flow within the intake duct of the manifold. As such, the valve that is associated with the inner area of the manifold always receives less gas than the valve that is associated with the outside curved area of the manifold, which results in downgraded cylinder charging. This has a negative effect on exhaust gas values and the power output achieved by the engine.

Figure 22:
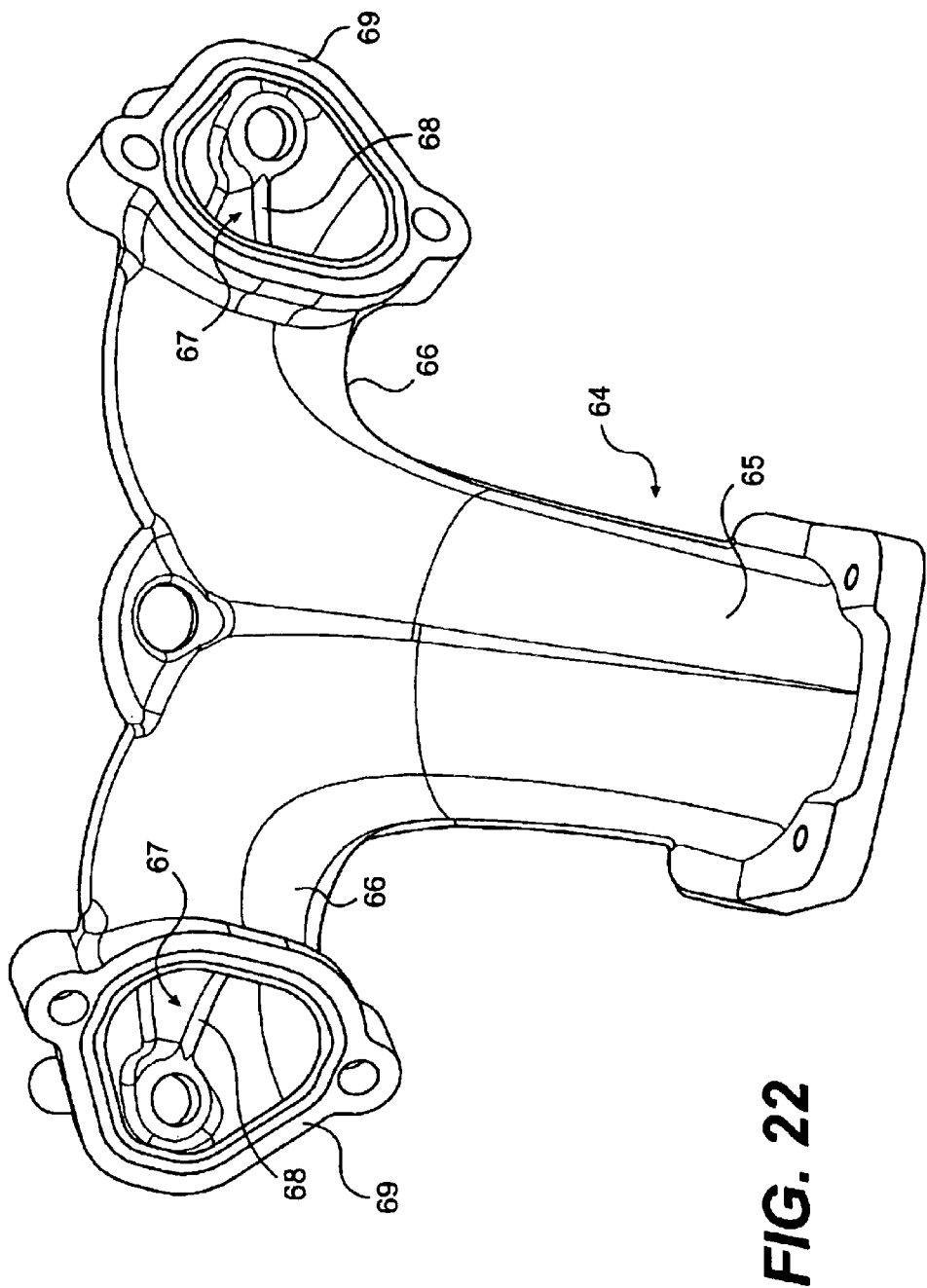
FIG. 22 is bottom schematic view of a Y-manifold used in the engine of FIG. 1 according to the present invention.
Figure 23:
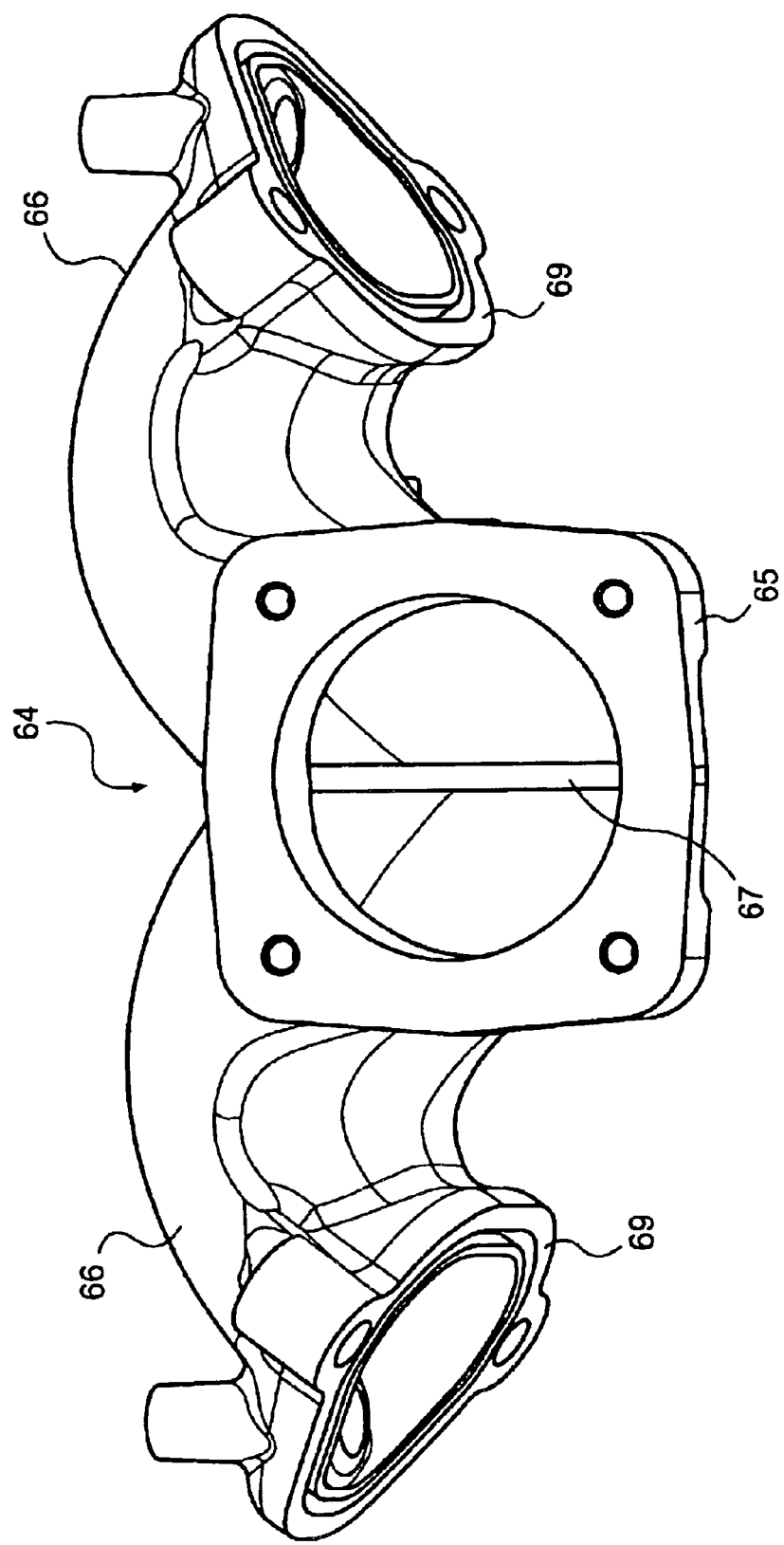
FIG. 23 is an end schematic view of the Y-manifold of FIG. 22.
Figure 24:
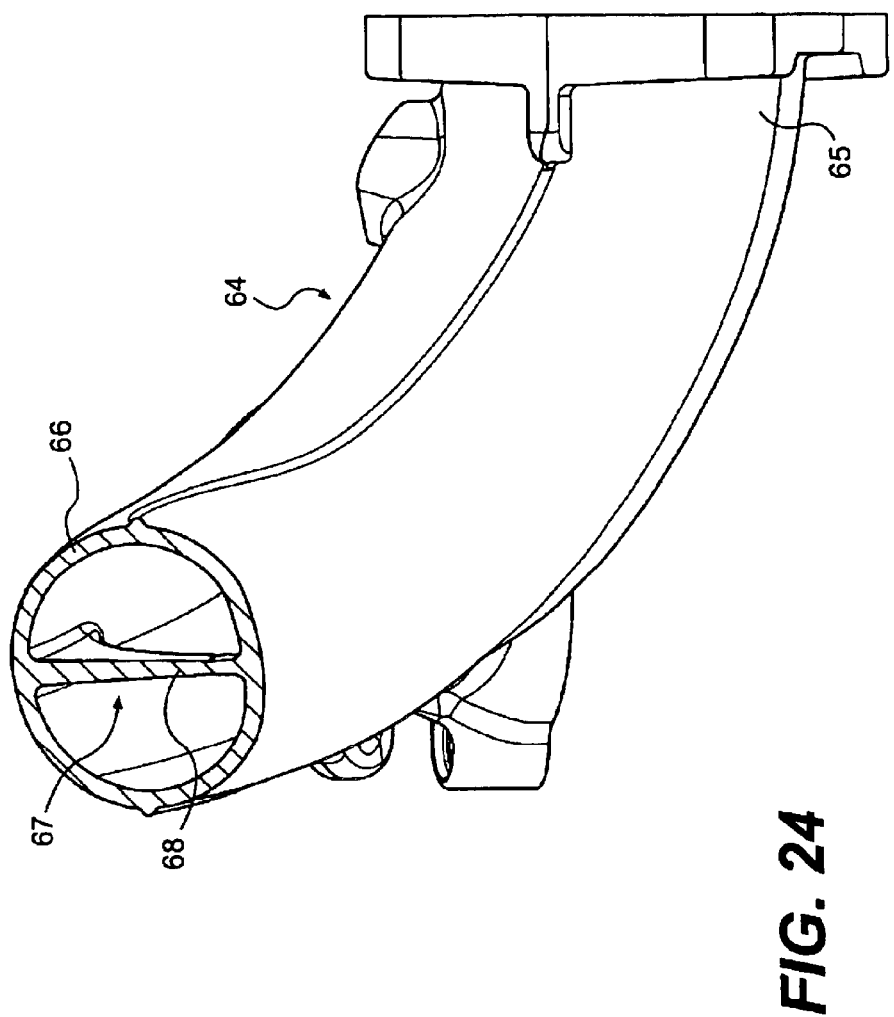
FIG. 24 is a partial cross sectional view of one of the secondary branches of the Y-manifold of FIG. 22.

Little, if any, interference is created within the Y-manifold 64. To ensure an even distribution of the air to each of the inlet ports of the two cylinders 4A and 4B, at least one baffle 67 is provided within the interior of the Y-manifold, as shown in FIGS. 22–24. As shown in FIG. 24, the baffles 67 are oriented in the direction of flow and divide the flow cross section of the main branch 65 and of at least the two secondary branches 66 into flow cross sections that are of approximately equal size such that equal volumes of the air are delivered to each inlet valve for each cylinder. The baffles 67 are in the form of dividers 68 that are formed in the Y-manifold and are oriented parallel to the axis 70, shown in FIGS. 4 and 6, of each cylinder 4A or 4B in the area 69 where the Y-manifold 64 opens out into the cylinder heads 8A and 8B of the engine 1.

Figure 11:
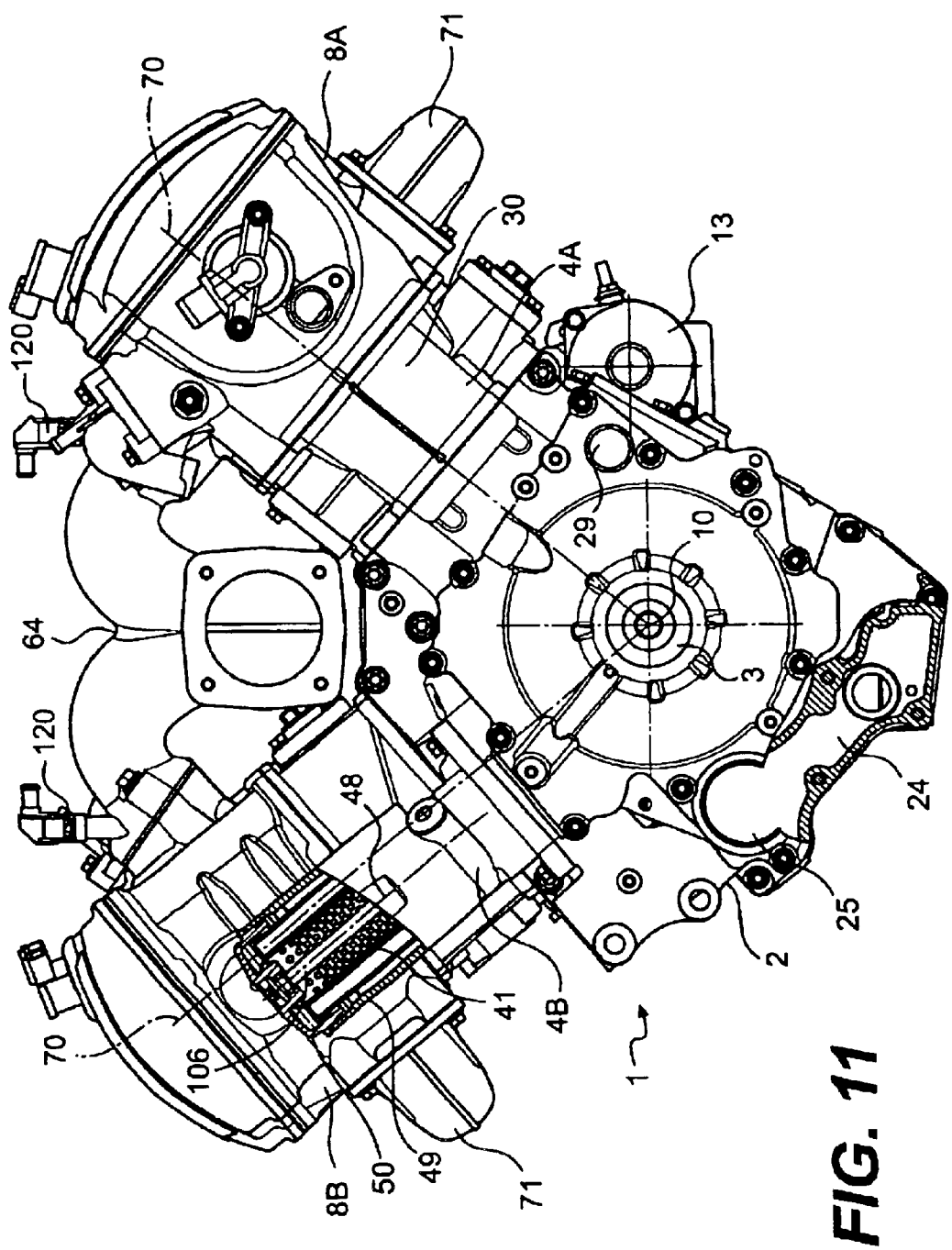
FIG. 11 is an end view of the engine illustrated in FIG. 3 having the oil tank and throttle assembly omitted, wherein chamber 24 and the oil filter 41 are shown in partial cross section.

As shown in FIG. 11, the engine 1 includes exhaust pipes 71 that extend from the outlet ports in the cylinder heads 8A and 8B. In accordance with the present invention, the exhaust pipes 71 may be connected directly to a muffler 19, as shown in FIG. 1. In the event that the engine 1 includes a turbocharger 22, the exhaust pipes 71 are connected to the turbocharger 22, as shown in FIG. 17. In this way, the exhaust gases are utilized to drive the turbine of the turbocharger 22 before being directed to the muffler 19. The muffler 19 is positioned on a side of the engine 1 opposite the output side (i.e. on a side opposite the CVT 11 and the oil tank 23). The exhaust gases generated by the engine 1 are routed from the muffler 19 in a downwardly towards the underside of the snowmobile and against the snow-covered surface of the ground. This greatly reduces exhaust noises.

The engine 1 is preferably equipped with a fuel-injection system to deliver fuel to the air as it is being fed into the cylinders 4A and 4B. The fuel-injection system preferably includes at least one injection nozzle 120, 121 associated with each cylinder 4A and 4B. The supercharged version of the engine preferably includes a pair of nozzles 120 and 121 for each cylinder 4A and 4B. One injection nozzle 120 supplies the engine 1 with its basic fuel supply. The other injection nozzle 121 ensures that a sufficient supply of fuel is available when the engine 1 is operating in the upper area of the engine load range. The operation of the injection nozzles is controlled by a control unit (not shown). Each injection nozzle 120 is preferably located in an area where the intake manifold 54 connects to the cylinder head 8A or 8B. Each injection nozzle 121 is preferably arranged upstream and spaced apart from the injection nozzle 120. The engines described in accordance with the present invention, however, are not limited to the use of a fuel-injection system; rather, it is contemplated that a conventional carburetor may be used instead of a fuel-injection system. In such a case, the carburetor would replace the throttle assembly 55. While the two nozzle arrangement is preferred for the supercharged version of the engine 1, one nozzle for each cylinder can be used. Furthermore, multiple nozzles maybe used for other versions of the engine.

The lubrication system for the engine 1 will now be described in greater detail. The engine 1 is lubricated by a dry-sump lubrication system, in which the lubricating oil is held in two areas until required for further use. The first area is a chamber 24 formed in the crankcase 2. The second area is an oil tank 23 that is located between the crankcase 2 and the CVT 11, as shown in FIGS. 1–3. Both the tank 23 and the chamber 24 are near the engine 1 so that long connection conduits for transporting the lubricating oil are avoided. The oil tank 23 is connected to the chamber 24 through a common opening 25. The chamber 24 and oil tank 23 are in fluid communication at all times. The oil tank 23 is preferably formed from a plastic material. The oil tank 23 is releasably secured to the output side of the crankcase 2. As shown in FIG. 3, the crankshaft 3 passes through an opening formed in the oil tank 23. As shown in FIGS. 2 and 3, the oil tank 23 includes a filler neck 36 and a lubricating oil dipstick 37. This arrangement of the oil tank 23 does not adversely effect the position of the center of gravity of the engine because of the relative low weight of the oil tank 23 and the low weight of the lubricant that it contains.

The chamber 24 is formed in a lower portion of the crankcase 2 essentially beneath the axis 10 of the crankshaft 3. Because a volume of the lubricating oil is in part stored in the chamber 24 in the crankcase 2, the size of the external lubricating-oil tank 23 can be reduced to save space. The chamber 24 can accommodate a predetermined volume of the total volume of lubricating oil required for the engine. The chamber 24 should accommodate at least 30% of the total volume of lubricating oil. It is preferable that the chamber 24 accommodates at least 50% of the total volume of lubricating oil. In the embodiment shown in the figures, the volume makes up approximately 55% of the total volume. The chamber 24 in accordance with the present invention is not limited to these prescribed volumes; rather, it contemplated that chambers holding volumes of less than 30% or greater than 50% are considered to be well within the scope of the present invention.

The integration of the chamber 24 into the crankcase 2 is also useful during engine start-up. During a cold start, the lubricating oil is brought to operating temperature more quickly by the radiated or waste heat generated by the engine 1. Thus wear on the engine is greatly reduced.

Figure 16:
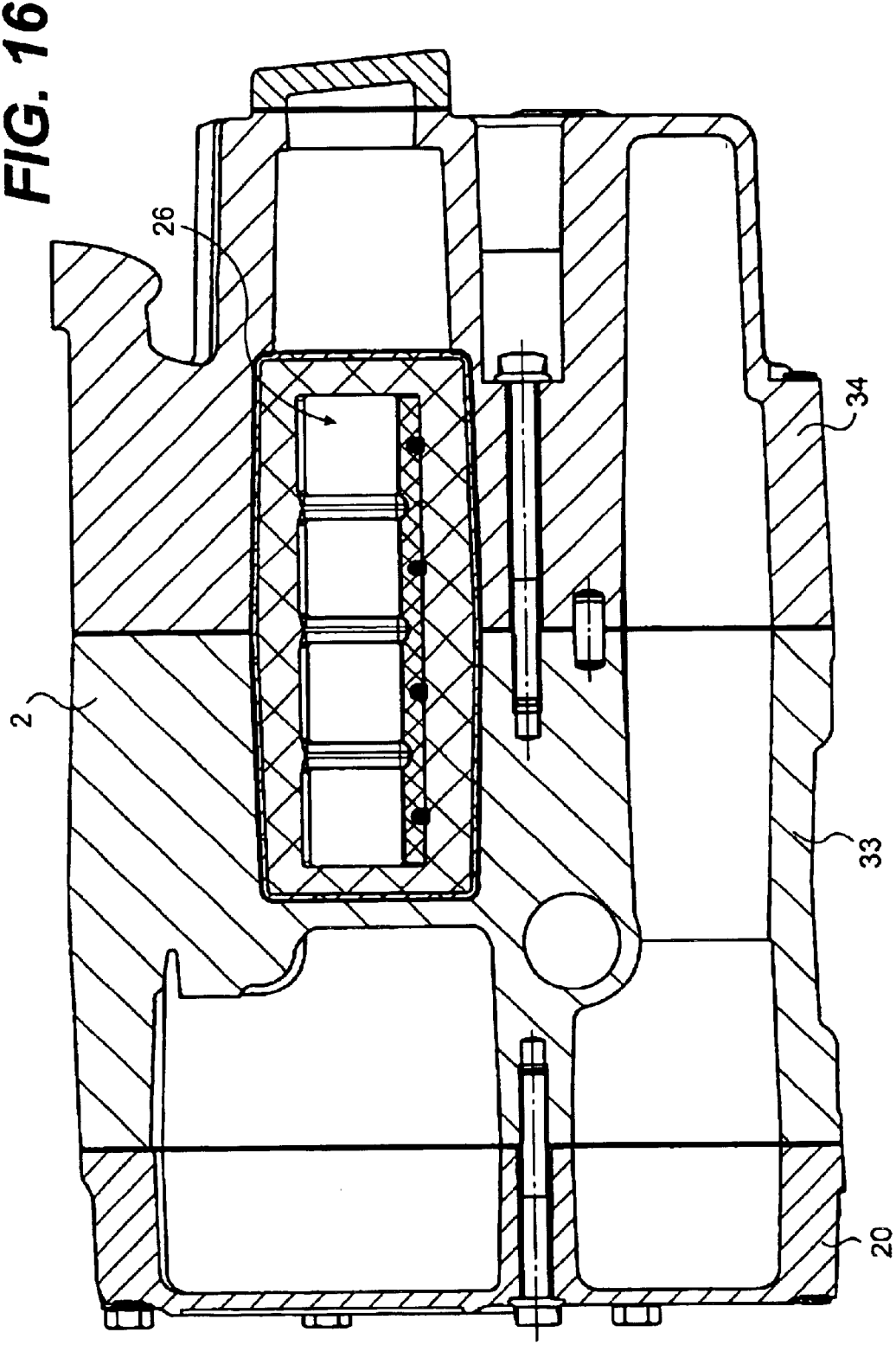
FIG. 16 is a cross sectional view of a non-return valve within the crankcase of the engine illustrated in FIG. 1.

During engine operation, some lubricating oil collects in the crankcase chamber 5. As seen in FIG. 12, a skimmer bar 101 located in the chamber 5 collects and directs the lubricating oil towards an outlet area in the bottom area of the crankshaft chamber 5. A non-return valve 26 is arranged in the outlet area at the bottom of the crankshaft chamber 5 and is held positively between the crankcase halves 33 and 34, as shown in FIG. 16. The non-return valve 26 is intended to prevent large quantities of lubricating oil flowing back into the crankcase chamber 5 as a result of the suction force generated during upward movement of the piston 6. The non-return valve 26 is preferably a reed valve. The lubricating oil is pumped out of the crankshaft chamber 5 by the pressure pulses that are generated within the crankshaft chamber 5 by the pistons 6. After passing through the valve 26, the oil passes through a strainer 27 and collects in a collection space 28 that is within the crankcase 2. The lubricating oil is returned to the tank 23 by the suction pump 15 by way of the connecting channel 29.

Some blow-by gas enters into the crankshaft chamber 5 from the combustion chamber. The blow-by gas in the crankcase chamber 5 helps remove the lubricant from the crankshaft chamber 5. The blow-by gas exits the crankcase chamber 5 through the non-return valve 26 with the lubricating oil. The blow-by gas passes through an oil separator that separates the lubricating oil from the blow-by gas. The oil separator is located on a sprocket of the camshaft (i.e., the separator is integrated into the camshaft drive system) and is described in detail in co-pending U.S. patent application Ser. No. 09/944,144, filed on Sep. 4, 2001 entitled "Blow-By Gas Separator And Decompressor for an Internal Combustion Engine," which is incorporated specifically herein by reference. The clean blow-by gas is returned to the air box 52.

Figure 13:
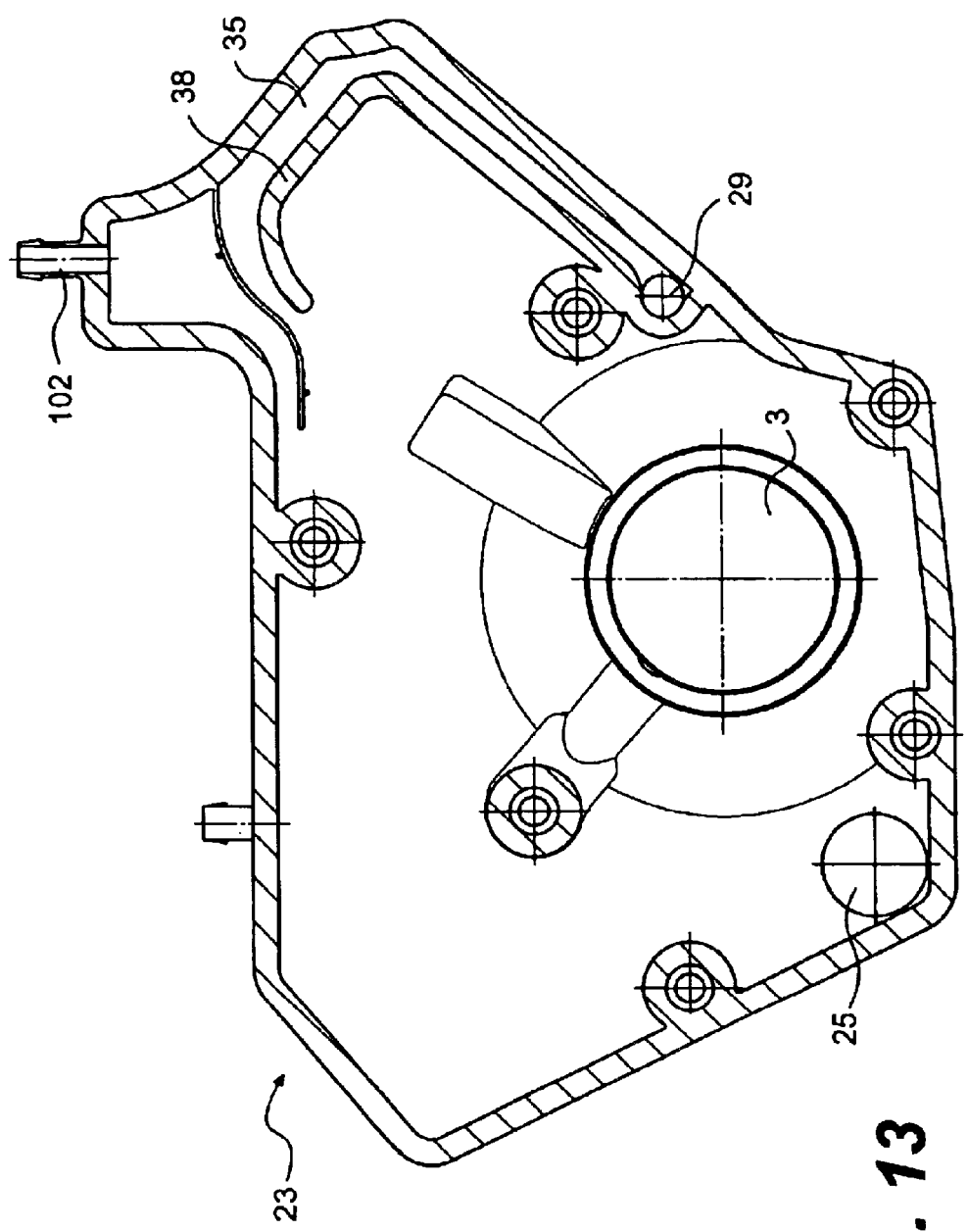
FIG. 13 is a cross sectional view of the lubricating-oil tank of the engine illustrated in FIG. 1.

The suction pump 15 is preferably an eccentric rotor (trochoidal) pump that is arranged on one end face of the crankcase 2 and driven by the toothed-wheel gearing 18. The present invention, however, is not limited to an eccentric rotor pump; rather, other pumping assemblies are considered to be well within the scope of the present invention. As shown in FIG. 13, the connecting channel 29 opens out into the oil tank 23 through a riser line 35. The riser line 35 prevents the lubricating oil from flowing back out of the oil tank 23. In the event that the non-return valve 26 does not form a tight seal, the riser line 35 prevents the lubricating oil from flowing into the crankshaft chamber 5 when the engine 1 is not running, and thereby flooding the crankcase chamber 5. As shown in FIG. 13, the riser line 35 is formed by a baffle 38 in the lubricating-oil tank 23.

Various portions of the engine 1 are linked to the lubrication system. A timing-chain passageway 30 associated with the rear cylinder 4A, shown in FIG. 11, opens into the collection space 28. A timing chain passageway 32 associated with the front cylinder 4B, shown in FIG. 8, opens into the secondary housing 20. The secondary housing 20 is connected to the collection space 28. Lubricating oil flowing from the valve gear through the timing chain passageways 30 and 32 can thus collect in the aforementioned collection space 28 at the bottom of the crankcase 2. As shown in FIG. 12, the collection space 28 is separated from the first volume of lubricating oil within the chamber 24. It is preferable that the engine 1 includes more than one strainer 27. One strainer is located within each crankcase half 33 and 34 in such a way that the lubricating oil flowing from the timing chain passageways 30 and 32 passes through the strainer before it flows into the collection area 28. This ensures that all the lubricating oil is filtered and no coarse impurities can enter the suction pump 15.

The oil tank 23 includes a vent port 102, which vents the tank 23 into the timing chain shaft 32 of the cylinder 4B. In principle, of course, the other timing chain shaft 30 could also be used for this purpose. On its way to the collection area 28, the lubricating oil that flows back from the timing chain shaft 32 passes through the driving gear for the auxiliary units to help lubricate the toothed-wheel gearing 18.

The engine 1 includes various lubrication points located throughout the engine 1, which are supplied with lubricant by the force pump 16 mounted on an end of the crankcase 2 within the secondary housing 20. The force pump 16 is preferably an eccentric rotor (trochoidal) pump driven by the toothed-wheel gearing 18. The present invention, however, is not limited to an eccentric rotor pump; rather, other pumping assemblies are considered to be well within the scope of the present invention. The force pump 16 draws the lubricating oil from the chamber 24 through an oil pickup assembly 39, and routes the oil to various lubrication points within the engine (e.g., the crankshaft and connecting-rod bearings, the valve gear, etc.) by way of a lubricating oil cooler 40 and a lubricating oil filter 41, shown in FIGS. 4 and 11. The oil cooler 40 is preferably a plate-type heat exchanger that is releasably secured to the crankcase 2. Preferably, the engine coolant is routed to the cooler 40 through passageways 47A to cool the lubricating oil and the lubricating oil is routed through the passageways 47B, shown in FIG. 6. The present invention, however, is not limited to a plate-type heat exchanger; rather, other heat exchangers and other cooling assemblies are considered to be well within the scope of the present invention. It is also contemplated that relative wind could also be used for cooling. For engine versions with low power output, the oil cooler may also be eliminated and the passageways 47A and 47B are closed by a cover (not shown) that is attached to the crankcase.

In order to simplify the oil filter changes that are performed during routine maintenance operations, an oil filter 41 that cleans the oil circulating in the lubrication system is mounted on the engine with its oil filter axis directed in an upward direction. The lubricating oil filter 41 has an oil filter axis 48 that is essentially parallel to the cylinder axis 70 of the cylinder 4B. The lubricating oil filter 41 is located within a housing 49, which is arranged between the front cylinder 4B and the oil tank 23, ahead of the axis 10. The oil filter 41 can be replaced by loosening the cover screw 106, after which the oil filter 41, the filter cover 50 and the cover screw 106 can be removed from the housing 49 as a single unit.

Figure 14:
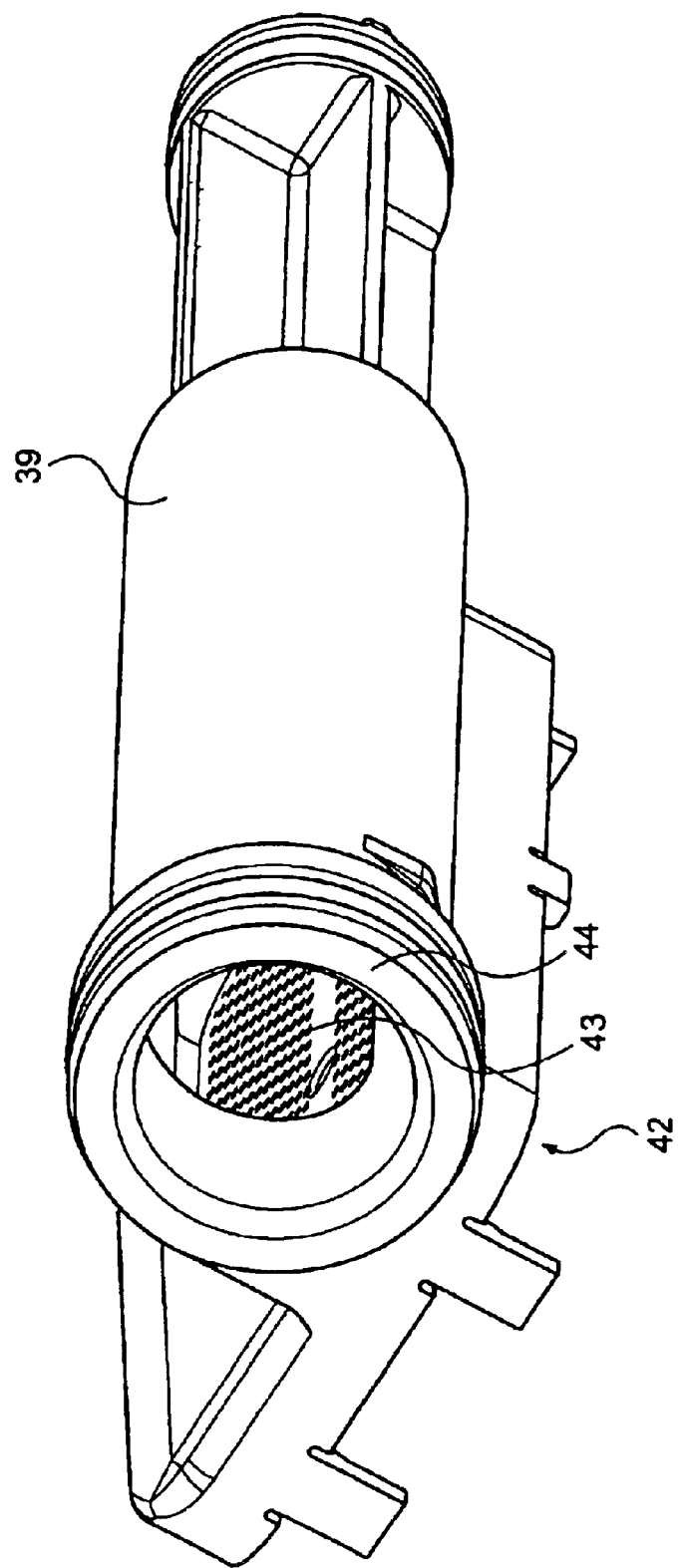
FIG. 14 is a schematic view of the oil pickup assembly.
Figure 15:
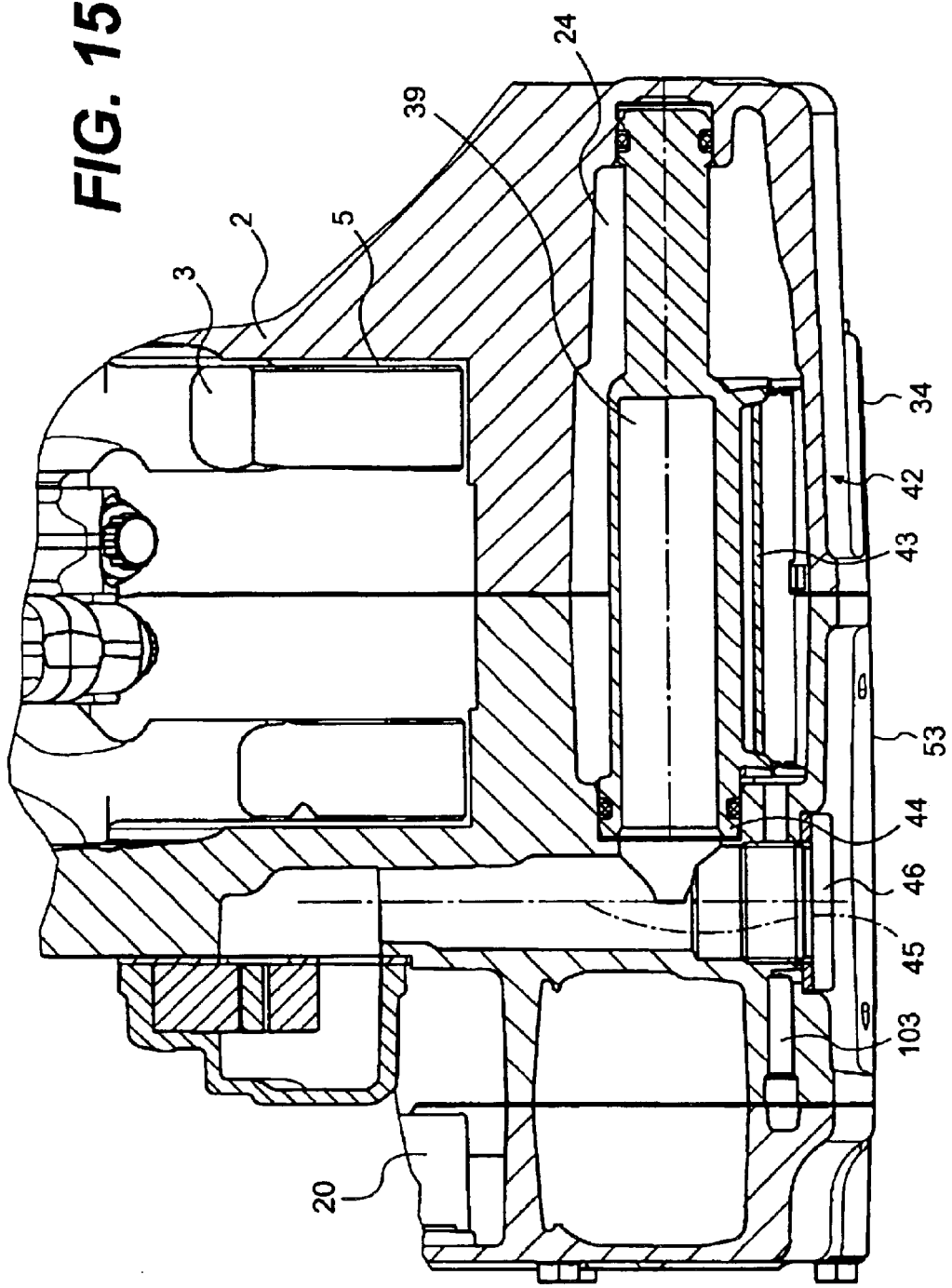
FIG. 15 is a cross sectional view of the oil pick up assembly of FIG. 14 along the main axis of the oil pickup assembly located within the engine of FIG. 1.

The oil pickup assembly 39 is shown in detail in FIGS. 14 and 15 is operatively connected to the suction side of the force pump 16, as shown in FIG, 7. The oil pickup assembly 39 is preferably formed from a plastic material. The oil pickup assembly 39 has a suction end 42 that includes a strainer 43 for trapping coarse impurities. The suction end 42 is submerged in the chamber 24, as shown in FIG. 15. An opposite end 44 of the oil pickup assembly 39 opens into a riser channel 45 that is formed in section 33 of the crankcase 2. The riser channel 45 extends into the suction side of the force pump 16, as shown in FIG. 7. The force pump 16 thus draws in lubricating oil through the strainer 43 of the oil pickup 39 and the riser channel 45.

The lower end of the riser channel 45 is closed off by a drain plug 46. It is possible to drain the lubrication system by removing a single drain plug. As discussed above, the lubricating-oil tank 23 is connected to the chamber 24 through the opening 25. Oil from the tank 23, chamber 24 may be drained by removing the oil drain plug 46. Oil from the collection space 28 is drained through a connecting channel 103 that is opened when the drain plug 46 is removed, as shown in FIG. 15.

Figure 10:
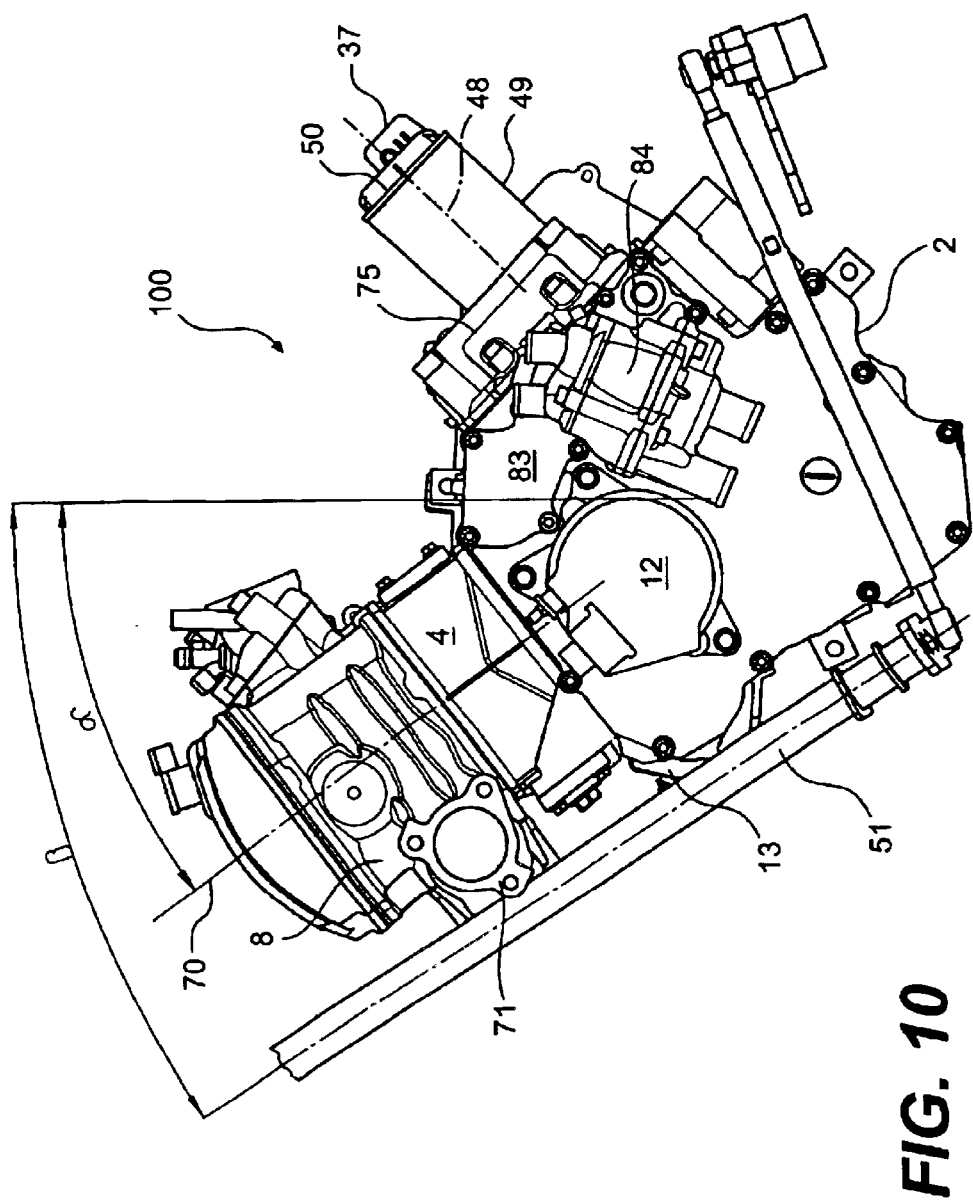
FIG. 10 is an end view of the engine of FIG. 9.

A single cylinder four-cycle engine 100 in accordance with the present invention will now be described in connection with FIGS. 9 and 10. The engine 100 shares many of the same components with V-twin four-cycle engine 1, described above. A discussion of these shared components has been omitted from the description of the engine 100. The single-cylinder engine 100 is constructed by omitting the cylinder 4B and cylinder head 8B, which are located in front of the axis 10 of the crankshaft in the V-twin engine 1. The opening in the crankcase 2 left by omitting the cylinder 4B and cylinder head 8B is closed by a cover 75. As shown in FIG. 9, a balance shaft 76 is arranged in the crankcase 2 in area of the omitted cylinder 4B and cylinder head 8B to balance any first order inertial forces. The balance shaft 76 is driven by the crankshaft 3 through a toothed-wheel gearing 77. The balance shaft 76 rotates in a direction opposite to the rotation direction of the crankshaft 3. The balance shaft 76 also drives the pump shaft 78 of the coolant pump 14. It is contemplated that the balance shaft 76 may be omitted, which may increase engine vibration.

It is desirable to move the center of gravity of the engine 100 as far to the rear as possible. In order to locate the center of gravity of the engine 100 as close as possible to the track 96, the cylinder 4B that is located in front of the crankshaft axis in engine 1 is omitted. To move the center of gravity of the engine 100 still further to the rear, the cylinder axis 70 can be rotated by more than 30° to the rear, relative to a vertical axis, and the cylinder 4 is arranged adjacent to it and alongside the steering rod 51. In the embodiment shown in FIG. 10, the angle $\alpha$ between the axis 70 of the cylinder 4 and the vertical axis is approximately 37°. The steering rod 51 extends to one side of and adjacent to the cylinder 4 and cylinder head 8. The angle $\beta$ between the steering rod 51 and the vertical axis is approximately 34°. The present invention, however, is not limited to the angles; rather, other angles, both larger and smaller, are contemplated to be within the scope of the present invention. In general, it should be noted that the angle $\alpha$ between the axis of the cylinder 4 and a vertical axis is greater than the angle $\beta$ between the steering rod 51 and the vertical axis.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. It is contemplated that the lubrication system can also be used to cool the pistons 6 when the engine 1 is running and lubricate them at the same time. This can be accomplished by providing at least one lubricating oil nozzle (not shown) in the crankcase 2. The nozzles direct a stream of lubricant directly onto the inner surface of the piston for both cooling and lubrication. Thus, it is intended that the present invention covers the modifications and variations of the invention, provided they come within the scope of the appended claims and their equivalents.

What is claimed is:

1. A four cycle engine for use in a vehicle having a longitudinal axis, comprising:

a crankcase having a crankshaft extending therethrough, wherein the crankshaft has a crankshaft axis, wherein the crankshaft axis is transverse to the longitudinal axis of the vehicle;

at least one cylinder unit connected to the crankcase, wherein each cylinder unit includes a cylinder and a cylinder head;

a continuously variable transmission connected to the engine on one side of the longitudinal axis of the vehicle, wherein the continuously variable transmission is driven by the crankshaft;

at least one auxiliary unit connected to the crankcase;

a drive gearing operatively connected to the crankcase, wherein the drive gearing includes a toothed wheel gearing, wherein the drive gearing being operatively connected to at least one of the at least one auxiliary unit, wherein the at least one auxiliary unit being located on a side of the longitudinal axis of the vehicle opposite to the continuously variable transmission;

a starter operatively connected to the drive gearing; and the engine including a front side located on one side of the crankshaft axis and a rear side located on an opposite side of the crankshaft axis, wherein the starter has a center of gravity and the center of gravity being located to the rear side of the engine.

2. The engine according to claim 1, wherein the toothed-wheel gearing is located within a secondary housing connected to the crankcase.

3. The engine according to claim 1, wherein the at least one auxiliary unit includes at least one of a generator, an alternator, a water pump, an oil pump, and a charger.

4. The engine according to claim 3, wherein the engine includes a front side located on one aide of the crankshaft axis and a rear side located on an opposite side of the crankshaft axis.

5. The engine according to claim 4, wherein one auxiliary unit is a generator, wherein the generator has a center of gravity, wherein the center of gravity of the generator being located on the rear side of the engine behind the axis of the crankshaft.

6. The engine according to claim 5, further comprising:

a muffler system, wherein the muffler system being located on an opposite side of the longitudinal axis of the vehicle relative to the continuously variable transmission.

7. The engine according to claim 4, wherein one auxiliary unit is a charger, wherein the charger is a supercharger having a center of gravity, wherein the center of gravity of the supercharger being located on the rear side of the engine behind the axis of the crankshaft.

8. The engine according to claim 7, the supercharger being located on one side of a cylinder unit located on the rear side of the engine.

9. The engine according to claim 7, further comprising a charge-air cooler operatively connected to the supercharger, wherein the charge-air cooler being arranged on the front side of the engine.

10. The engine according to claim 4, wherein one auxiliary unit is a charger, wherein the charger is a turbocharger having an impeller, wherein the impeller has an axis, wherein the axis of the impeller is located on the rear side of the engine behind the crankshaft.

11. The engine according to claim 10, further comprising a charge-air cooler operatively connected to the turbocharger, wherein the charge-air cooler being arranged front side of the engine.

12. The engine according to claim 10, further comprising a deflector assembly connected to an intake side of the turbocharger, whereby the direction of a flow of air is changed in the deflector assembly before entering the turbocharger.

13. The engine according to claim 1, wherein the vehicle includes a steering rod, wherein the engine includes a front side located on one side of the crankshaft axis and a rear side located on an opposite side of the crankshaft axis, wherein one of the cylinder units is located on the rear side of the engine adjacent the steering rod and laterally offset from the same.

14. The engine according to claim 13, wherein the cylinder unit located on the rear side of the engine has a cylinder axis, wherein a first angle is formed by the cylinder axis and a vertical axis, wherein a second angel is formed by the steering rod and the vertical axis, wherein the first angle is greater than the second angle.

15. The engine according to claim 13, wherein one of the cylinder units being located on the front side of the engine, wherein the one cylinder unit on the front side being located closer to the longitudinal axis than the cylinder unit on the rear side.

16. The engine according to claim 1, further comprising:

an oil tank for receiving at least a portion of the engine lubricant, wherein the oil tank is mounted to the crankcase on one side of the longitudinal axis between the crankcase and the continuously variable transmission.

17. The engine according to claim 16, wherein the crankshaft extends through an opening in the oil tank.

* * * * *